United States Patent [19]
Vescovi et al.

[11] Patent Number: 6,108,612
[45] Date of Patent: Aug. 22, 2000

[54] CODED OBJECTS AND METHODS FOR DETECTING SUCH CODED OBJECTS

[75] Inventors: Marcos R. Vescovi; Michele M. Covell; Philippe P. Piernot; Malcolm G. Slaney, all of Palo Alto; Steven E. Saunders, Cupertino, all of Calif.

[73] Assignee: Interval Research Corporation, Palo Alto, Calif.

[21] Appl. No.: 09/103,265

[22] Filed: Jun. 23, 1998

[51] Int. Cl.⁷ .................................................. G06K 19/06
[52] U.S. Cl. .......................... 702/150; 348/813; 235/469; 235/494
[58] Field of Search ............................ 702/150; 348/813; 235/494, 469; 283/114, 93; 315/383, 382

[56] References Cited

U.S. PATENT DOCUMENTS 5,291,102  3/1994  Clayton ..................................... 315/383
5,818,032  10/1998  Tom et al. ............................... 235/494

OTHER PUBLICATIONS

Leplumey et al., "Kalman Filter Contributions towards document Segmentation", IEEE, Sep. 1995.

Viard–Gaudin et al., "A Bar Code location algorithm using a two–dimensional Approach", IEEE, Sep. 1995.

*Primary Examiner*—Kamini Shah
*Attorney, Agent, or Firm*—Beyer Weaver & Thomas, LLP

[57] ABSTRACT

Disclosed is a method of finding a reference object within a coded object having a plurality of regions. Each region has a plurality of subregions, and at least a majority of a first one of the subregions has a different color from a second one of the subregions. The reference object has a known relative position to other objects within the coded object so that the reference object is utilizable to locate the other objects within the coded object. A first one of the subregions within a selected one of the regions within the coded object is selected. A first region and a second region within the coded object are also selected. The selected first and second region form a plurality of subregion pairs. Each subregion pair includes a subregion from the seleced first region and a subregion from the selected second region. Luminosity values of the subregions within each subregion pair are compared. It is determined whether the selected subregion is the reference object based on the comparisons of the luminosity values for each subregion pair.

41 Claims, 20 Drawing Sheets

| First Outer Boundary | Angle Differences | | | | | |
|---|---|---|---|---|---|---|
| | 1st | 2nd | 3rd | 4th | 5th | 6th |
| Between bits 7 & 13 | 0 | $\Delta 1$ | $\Delta 1+$ $\Delta 2$ | $\Delta 1+$ $\Delta 2+$ $\Delta 3$ | $\Delta 1+$ $\Delta 2+$ $\Delta 3+$ $\Delta 4$ | $\Delta 1+$ $\Delta 2+$ $\Delta 3+$ $\Delta 4+$ $\Delta 5$ |
| Between bits 7 & 8 | $\Delta 1$ | $\Delta 1+$ $\Delta 2$ | $\Delta 1+$ $\Delta 2+$ $\Delta 3$ | $\Delta 1+$ $\Delta 2+$ $\Delta 3+$ $\Delta 4$ | $\Delta 1+$ $\Delta 2+$ $\Delta 3+$ $\Delta 4+$ $\Delta 5$ | 0 |
| Between bits 12 & 13 | $\Delta 1+$ $\Delta 2+$ $\Delta 3+$ $\Delta 4+$ $\Delta 5$ | 0 | $\Delta 1$ | $\Delta 1+$ $\Delta 2$ | $\Delta 1+$ $\Delta 2+$ $\Delta 3$ | $\Delta 1+$ $\Delta 2+$ $\Delta 3+$ $\Delta 4$ |

CODED OBJECTS AND METHODS FOR DETECTING SUCH CODED OBJECTS

CROSS REFERENCE TO RELATED APPLICATIONS

This application claims priority to U.S. patent application Ser. No. 09/017,450 filed Feb. 2, 1998 entitled "Coded Object System and Code Recognition Methods" by Vescovi, et al., which is incorporated herein by reference for all purposes. This application is related to U.S. patent application Ser. No. 09/018,023 filed Feb. 2, 1998 entitled "Computer Method and Apparatus for Interacting with a Physical System" by Piernot, et al. and to U.S. patent application Ser. No. 08/675,104 filed Jul. 3, 1996 entitled, "Video Camera Based Computer Input System With Interchangeable Physical Interface" by Piernot, et al., having assignment rights in common with the present invention, and which are herein incorporated by reference.

BACKGROUND OF THE INVENTION

This invention relates generally to a coded object system and computer methods for recognizing codes and more particularly to coded objects and code recognition methods within an environment with low lighting, and with low resolution and low dynamic range capabilities of the code reader.

Bar-codes are a specific type of coded object and are becoming increasingly popular as a means of identifying objects. Consequently, bar-codes are quickly being introduced into many segments of society. That is, bar-codes are not merely being used to identify grocery store items in a supermarket. For example, bar-codes are now being used by businesses to keep track of documents and by manufacturers to keep track of components within their assembly line.

When one thinks of conventional bar-codes, one initially thinks of bar-codes that are used on product packaging to identify the product type and price, for example. Typically, a product bar-code is in the form of dark lines or "bars" against a light background. The dark bars are arranged in parallel and are of varying width. Typically, a bar-code reader that includes a laser beam is configured to read the bar-code. The identification of each bar-code is determined by ascertaining the arrangement of bars and associated widths of the bar-code. A similar type arrangement is used for recognizing business documents.

Although the above-described bar-code system works adequately within the business world, this bar-code system has many limitations. For example, the bar-code must conform to a set of strict size and shape requirements. Also, the bar-code must be positioned directly under the laser beam of the bar-code reader or the laser beam must be positioned directly over the bar-code. This positioning must be accomplished in such a way as to allow the laser beam to move across the parallel widths of the bars. If these requirements are not met, the bar-code reader will fail to correctly identify the bar-code. Thus, one must ensure that the bar-codes meet the size and shape requirements, and that the bar-code reader is used correctly. Since one cannot completely eliminate human error, for example, it is difficult to achieve perfect reliability for reading and identifying bar-codes in the above-described conventional system.

Another conventional bar-code system utilizes a camera for reading the bar-code, instead of a laser, and is typically found within a manufacturing environment. For example, bar-codes are placed on components so that a camera may identify each component as the components moves through the assembly line. That is, a camera may be placed at a specified location such that a bar-code of a component moves directly below the camera. The camera translates the bar-code into a representational image, and the image is then analyzed and interpreted. The camera is typically configured and positioned so that the bar-code fills the view of the camera and the camera takes a high-resolution bar-code image which is then analyzed and identified.

Like the conventional laser-based bar-code system, the conventional camera-based bar-code system has many disadvantages. For example, in order to achieve accurate results, the camera must have a high dynamic range, the lighting must be consistently bright, or the resolution of the bar-code image must be relatively high. Otherwise, the bar-code image may be incorrectly interpreted. For example, under low lighting conditions, it will be difficult to tell the light bars from the dark bars. By way of another example, if the resolution is too low, the bar-code image may appear blurry (e.g., anti-aliasing). That is, one dark area of the bar-code is mapped onto too few pixels, and the bar-code image is analyzed incorrectly. In sum, the reliability of the camera-based bar-code system is dependent on lighting conditions, resolution parameters, and camera specifications.

As a result of the built-in constraints of the above-described conventional bar-codes recognition systems, the above-described systems only work reliably in a tightly constrained environment. For example, conventional bar-code systems may not work well in the context of a system where the bar-code is positioned within a small area of the image. By way of another example, the reliability of conventional bar-code systems may be significantly reduced under poor or nonuniform lighting conditions.

Thus, there is a need for an improved coded object system and a method for recognizing coded objects within the coded object system even when lighting conditions, resolution parameters, and camera capabilities are not ideal. That is, what is needed is a method and apparatus for recognizing codes within a less constrained environment. Additionally, there is a need for a code recognition system that could be implemented in real time and run on a relatively low-end processor.

SUMMARY OF THE INVENTION

To achieve the foregoing and other objects and according to the purpose of the present invention, a method of tracking coded objects that are located within a physical system and are represented within an image is disclosed.

In one embodiment, a method of locating a correct reference pixel within an image is disclosed. The correct reference pixel represents a reference object within a coded object that has a known code pattern. The image is received, and the image has a plurality of coded object pixels. The coded object pixels include a first expected reference pixel and a plurality of first pixels and second pixels. Most importantly, each first pixel is expected to have a different color from an associated second pixel. The method further includes the act of determining whether the first expected reference pixel is the correct reference pixel by comparing luminosity values of the first pixel and the second pixel.

In one aspect of the invention, the act of determining whether the first expected reference pixel is the correct reference pixel is further comprised of the act of comparing the luminosity value of the first expected reference pixel and each first pixel and associated second pixel. It is determined whether more than a first predefined number of maximum luminosity values of each first pixel and associated second pixel are greater than the luminosity value of the first expected reference pixel. The first expected reference pixel is defined as the correct reference pixel when more than a first predefined number of maximum luminosity values of the first pixels and associated second pixel are greater than the luminosity value of the first expected reference pixel.

In another aspect, the coded object pixels further include a second expected reference pixel and a plurality of third pixels and fourth pixels, wherein each third pixel is expected to have an opposite color from an associated fourth pixel. The act of determining whether the second expected reference pixel is the correct reference pixel is accomplished by comparing each luminosity value of the second reference pixel and each third pixel and associated fourth pixel. It is determined whether more than a predefined number of maximum luminosity values of each third pixel and associated fourth pixel are greater than the luminosity value of the second expected reference pixel.

If more than a predefined number of maximum luminosity values of each third pixel and associated fourth pixel are greater than the luminosity value of the second expected reference pixel, it is determined whether the second expected reference pixel has more pairs that have maximum luminosity values that are greater than the luminosity value of the second expected reference pixel than the first expected reference pixel does.

The second expected reference pixel is defined as the correct reference pixel when more than a predefined number of maximum luminosity values of each third pixel and associated fourth pixel are greater than the luminosity value of the second expected reference pixel and when the second expected reference pixel has more pairs that have maximum luminosity values that are greater than the luminosity value of the second expected reference pixel than the first expected reference pixel does.

The first expected reference pixel is defined as the correct reference pixel when the second expected reference pixel does not have more pairs that have maximum luminosity values that are greater than the luminosity value of the second expected reference pixel than the first expected reference pixel does.

In one embodiment of the present invention, a coded object that is configured to be scanned by a camera and included in an image that is received as input to a computer implemented coded object recognition program is disclosed. The coded object includes a reference object, a first region, and a second region. The first region has a plurality of first subregion pixel pairs, and the second regions has a plurality of second subregion pixel pairs. Each first subregion pixel pair includes two opposite color first subregion pixels, and each second subregion pixel pair includes two opposite color second subregion pixels. The reference object, first region, and second region are arranged in a known code pattern such that the correct reference pixel may be located by finding an expected reference pixel and a plurality of associated pixel pairs within the received image that most closely match the known code pattern of the reference object, first region, and second region.

In one embodiment, the first subregion pixel pairs form a plurality of first identifiers for the coded object and the second subregion pixel pairs form a plurality of second identifiers for the coded object. In another embodiment, a first boundary between two of the first identifiers substantially aligns with a second boundary between two of the second identifiers such that a position of the alignment may be defined as a position of an angle object for detecting the coded object's orientation.

BRIEF DESCRIPTION OF THE DRAWINGS

FIG. 12 is a table that summarizes the angle differences between each outer boundary and adjacent inner boundary starting at a particular first outer boundary within the coded object of FIG. 7.

DETAILED DESCRIPTION OF THE PREFERRED EMBODIMENTS

Figure 1:
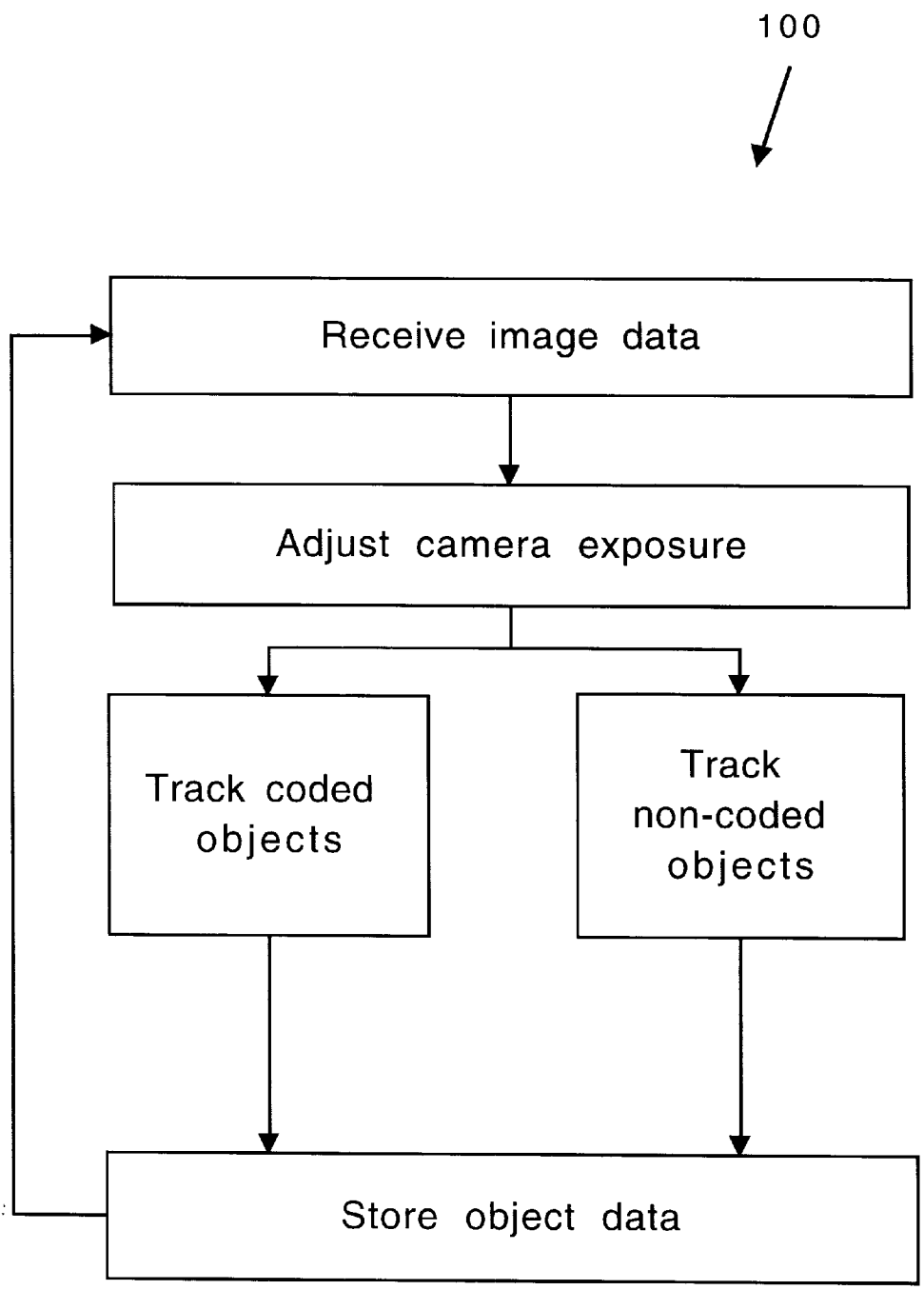
FIG. 1 is a flowchart illustrating a process of tracking objects within a physical system in accordance with one embodiment of the present invention.

While this invention has been described in terms of several embodiments and specific examples, there are alterations, permutations, and equivalents which fall within the scope of this invention. It is therefore intended that the following appended claims be interpreted as including all such alterations, permutations, and equivalents as fall within the true spirit and scope of the present invention.

In general terms, the current invention includes a method and apparatus for analyzing an image that represents a plurality of coded physical objects, and recognizing and analyzing the representations of the coded physical objects under varying conditions. The present invention may be implemented for tracking coded objects that have fixed locations, as well as tracking coded objects that have variable locations. (The term "tracking" includes the acts of recognizing, interpreting, and/or analyzing coded object representations within a particular frame, as well as from frame to frame).

The present invention may be implemented on any conventional hardware and computer interface system. For example, the present invention is well suited for recognizing and tracking game pieces within a physical game system, where the user may manipulate physical objects or game pieces on the game board, or toy board.

Basically, a camera obtains an image of the physical system, including the coded objects. The image is analyzed using techniques, which are described below, to identify and track the coded object.

Although portions of the following description are in reference to a game board, of course, the application of the current invention is not limited to a game board, but may be implemented with any appropriate physical objects where recognition of coded objects is required. Although the following description is in reference to a computer system interface, it should be understood that other type of interfaces may be used, such as a television game system or set top box.

The present invention may be implemented with a video camera computer input system having an interchangeable spatial reference member with various physical objects thereon. One example of an interchangeable spatial reference member is a game board. A camera is positioned to obtain an image of the interchangeable spatial reference member (or game board) and physical objects (game pieces). Several examples of various video camera computer input systems and spatial reference members are described in U.S. patent application Ser. No. 08/675,104 filed Jul. 3, 1995 entitled, "Video Camera Based Computer Input System With Interchangeable Physical Interface" by Piernot, et al., and which is herein incorporated by reference.

A computer method may be provided for interfacing with the physical objects of the game board in a complex manner. As the user interacts with the physical objects, the user is provided with a corresponding audiovisual interaction on the computer, which interaction greatly enhances the game experience. Several examples of computer interfaces for a physical game board are described in U.S. patent application Ser. No. 09/018,023 filed Feb. 2, 1998 entitled "Computer Method and Apparatus for Interacting with a Physical System" by Piernot, et al., which is incorporated herein by reference for all purposes.

FIG. 1 is a flowchart illustrating a process 100 of tracking objects within a physical system in accordance with one embodiment of the present invention. Initially, in operation 102, image data is received. This image may include a representation of the entire underside of the board game. For example, the image will include a plurality of pixels that represent various objects of a particular coded object on the game board. The image may also include non-coded objects, such as the user's hand as detected through a transparent board, for example.

After the image data is received, the camera exposure may be adjusted to obtain the best image in operation 104. Of course, the camera does not have to be adjusted if the image is already optimal or object identification reliability is at an acceptable level. In operation 106, the coded objects are tracked, which operation is further described in reference to FIGS. 2–6, 8–10, 12 and 13. In operation 108, the non-coded objects, if any, are tracked. Of course, operation 108 is optional and its inclusion depends on the application and whether it is necessary to track non-coded objects.

After the non-coded objects, if any, are tracked, object data that was obtained during the tracking operations 106 and 108 is stored in operation 110. Object data includes information that may be utilized to identify, interpret, locate, and/or recognize objects or portions of the coded object. Next, operations 102 through 110 are repeated so that another set of image data is received, the camera is adjusted, coded and non-coded objects are tracked, and a new set of object data is stored.

Several embodiments of the adjusting procedure of operation 104 and the procedure of operation 108 for tracking noncoded objects are further described in U.S. patent application Ser. No 09/017,450 filed Feb. 2, 1998 entitled "Coded Object System and Code Recognition Methods" by Vescovi, et al., which is incorporated herein by reference for all purposes.

Figure 2:
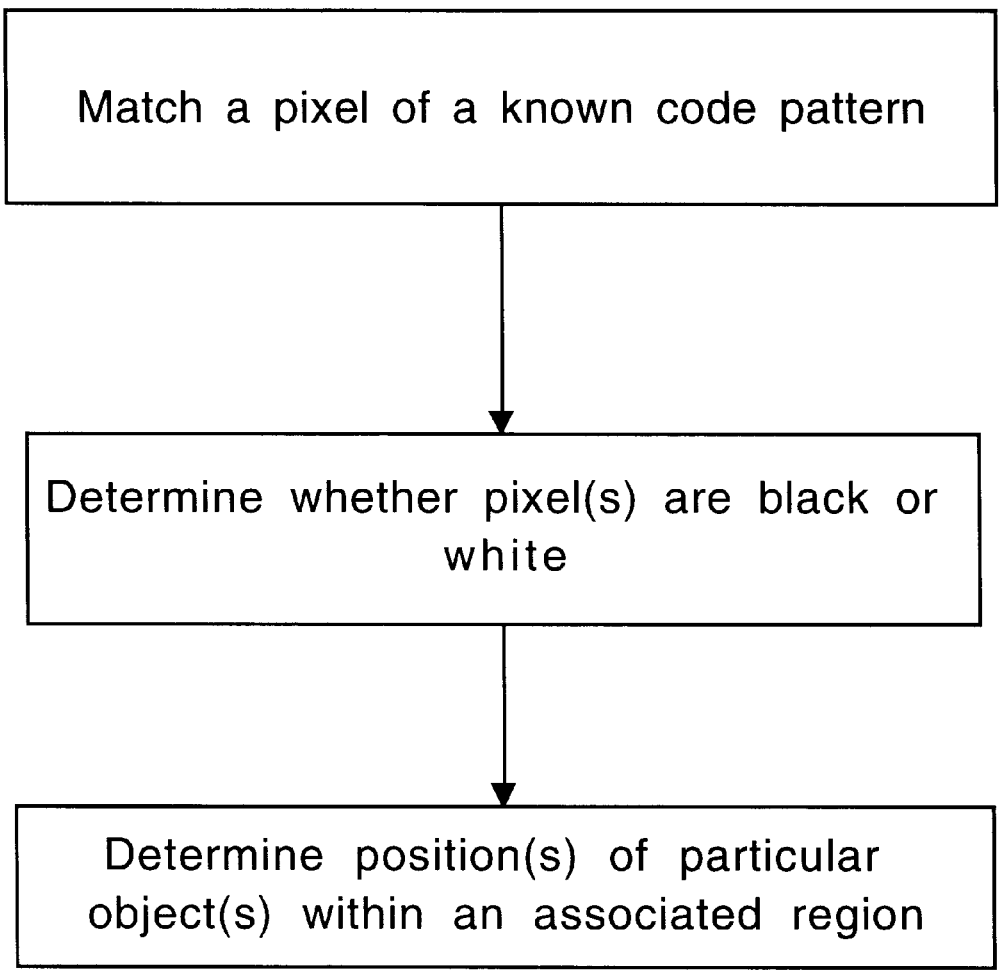
FIG. 2 is a flowchart illustrating the process of FIG. 1 of tracking coded objects in accordance with one embodiment of the present invention.

FIG. 2 is a flowchart illustrating the process 106 of FIG. 1 of tracking coded objects in accordance with one embodiment of the present invention. In contrast to conventional thresholding and segmentation techniques that are used for tracking non-coded objects, the process 106 of tracking coded objects works with gray-scale images, as well as color images.

Tracking coded objects is accomplished by comparing pixel luminosity values within the image. The results of the comparison(s) are analyzed in various ways and are used to recognize and interpret the coded objects. For example, the location of the reference object may be determined by locating a correct reference pixel that represents a reference object of a coded object (operation 202). Additionally, the location of various other objects within the coded object may be located with respect to the location of the reference object. By way of another example, the colors and corresponding identities of various objects may be determined by discriminating pixels (operation 204). By way of a final example, the positions of movable objects may be determined by locating one or more corresponding movable pixels relative to a known region or particular reference point (operation 206).

Of course, it may not be necessary to perform all three operations in order to track and recognize a coded object. The inclusion or exclusion of operations 202 through 206 depends on the design of the coded object and requirements of the application in which the coded object is being used. Operation 202 through 206 may be executed in any order that is suitable for tracking a particular coded object.

Additionally, each operation that is used for tracking coded objects has several alternative embodiments, where the embodiment choice depends, for example, on the particular design of the coded object and application being used. Several alternative embodiments are described below in reference to FIGS. 3–6, 8–10, 12 and 13 while other similar, as well as alternative, embodiments are described by Vescovi, et al., which is incorporated herein by reference above. Several embodiment of coded objects that work well with one or more of the alternative embodiments for tracking coded objects are described below in reference to FIGS. 7, 11, and 14–17. Although specific techniques have been described for tracking coded objects in reference to FIGS. 3–6, 8–10, 12 and 13, these techniques are merely example techniques for tracking coded objects by comparing pixel luminosity values and are not meant to limit the scope of the invention.

Figure 13:
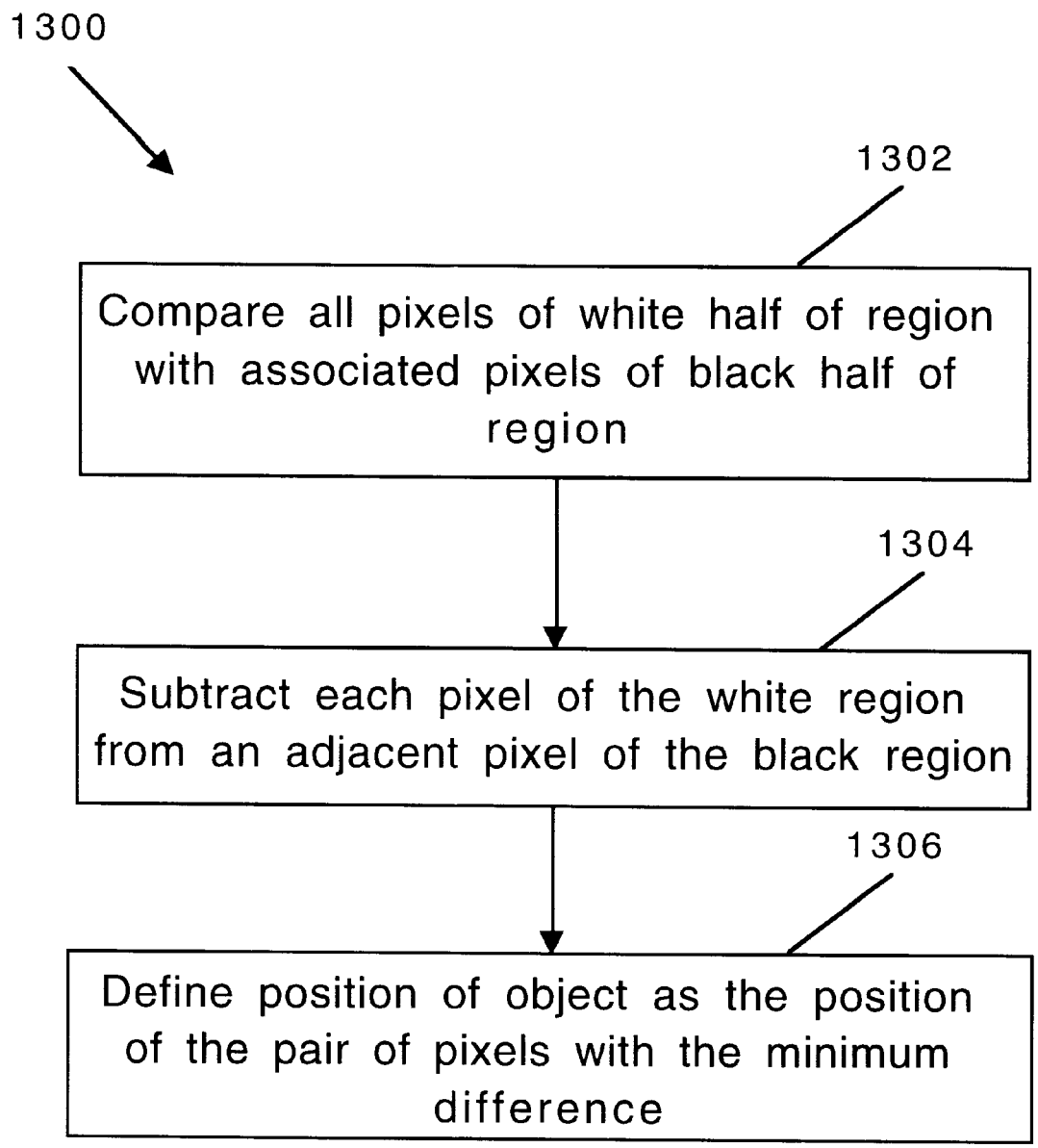
FIG. 13 is a flowchart illustrating a double-precision method for detecting the position of a particular object of a coded object in accordance with one embodiment of the present invention.

FIGS. 3–6 and 8–10 are flowcharts illustrating methods for detecting and selecting a correct reference pixel that represents a reference object of a coded object that has a known code pattern (operation 202). FIGS. 12 and 13 are a flowchart and a table, respectively, illustrating methods of detecting a position of object(s) (operation 206). Methods for discriminating pixels (operation 204) are described by Vescovi, et al., which is incorporated herein by reference above.

Several embodiments of methods for locating a reference object of a coded object are described below. The coded object has a known code pattern that may be utilized to locate the reference object or correct reference pixel, which pixel represents the reference object within a scanned image. When one determines the location of the correct reference pixel within the image of the physical system, one may easily then determine the relative locations of the physical reference object, as well as other objects of the coded object within the physical system. This is because the correct reference pixel corresponds to the reference object, and simple translation techniques may be implemented to match pixel locations within the image to physical locations within the physical system.

In this description, the phrase "locating a reference object" is used interchangeably with the term "locating a correct reference pixel". For example, when the location of the correct reference pixel has been determined, the location of the reference object may also determined. However, the location of the reference object does not necessarily have to be determined. That is, the location of the correct reference pixel within the image may be utilized in other ways. For example, the location of the correct reference pixel may be translated directly into an audiovisual image that is, itself, related to the physical location of the reference object.

In general terms, the methods of locating a correct reference pixel include identifying a particular pixel (herein referred to as an "expected reference pixel") as a possible reference pixel. This is accomplished by determining whether the expected reference pixel and a plurality of associated pixel pairs closely match a known code pattern of a coded object. If the possible reference pixel is the correct reference pixel, the possible reference pixel will have a plurality of associated black and white pixel pairs that are arranged in a particular configuration that closely matches the known code pattern. In sum, one may locate the correct reference pixel by comparing luminosity values of selected pixel pairs that are associated with a possible reference pixel.

Additionally, these methods may include methods for determining which of the possible reference pixels (if more than one) and associated pixel pairs most closely matches the known code pattern. The closest match may then be defined as the correct reference pixel that corresponds to the reference object of the coded object. Preferably, the selection of the possible correct reference pixels are limited to pixels that correspond to a smallest linear extent of the coded object. In other words, possible correct reference pixels are expected to be within an area of the image that corresponds to a physical area that may be occupied by the coded object.

Several alternative embodiments for detecting and selecting a reference pixel are described below in reference to FIGS. 3–6. The methods described below may be used alone or in combination with any code recognition methods that are described herein or described in the above referenced patent application by Vescovi, et al., which is incorporated herein by reference above.

Figure 3A:
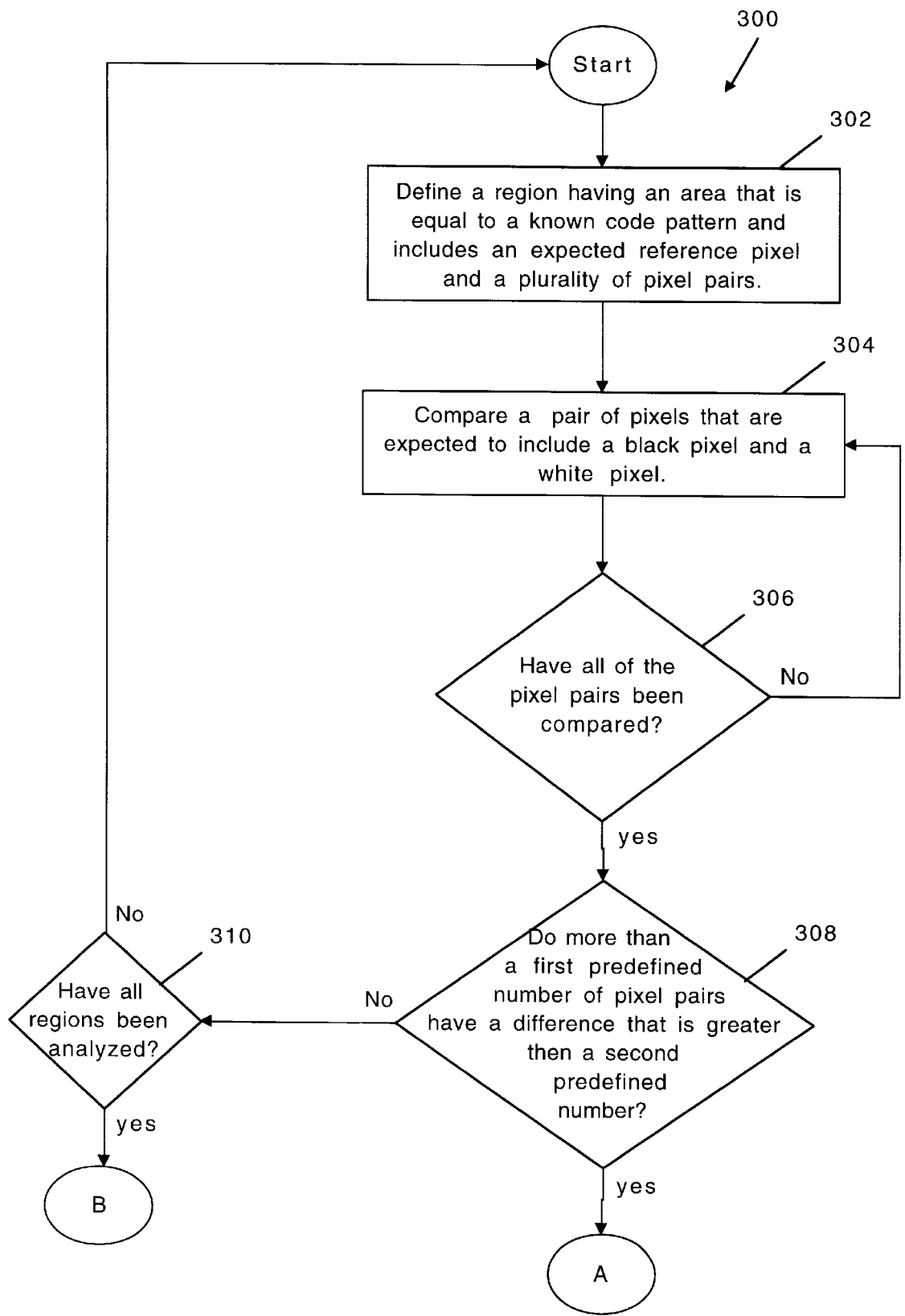
FIGS. 3A and 3B together form a flowchart illustrating a first pattern detection and selection method in accordance with one embodiment of the present invention.
Figure 3B:
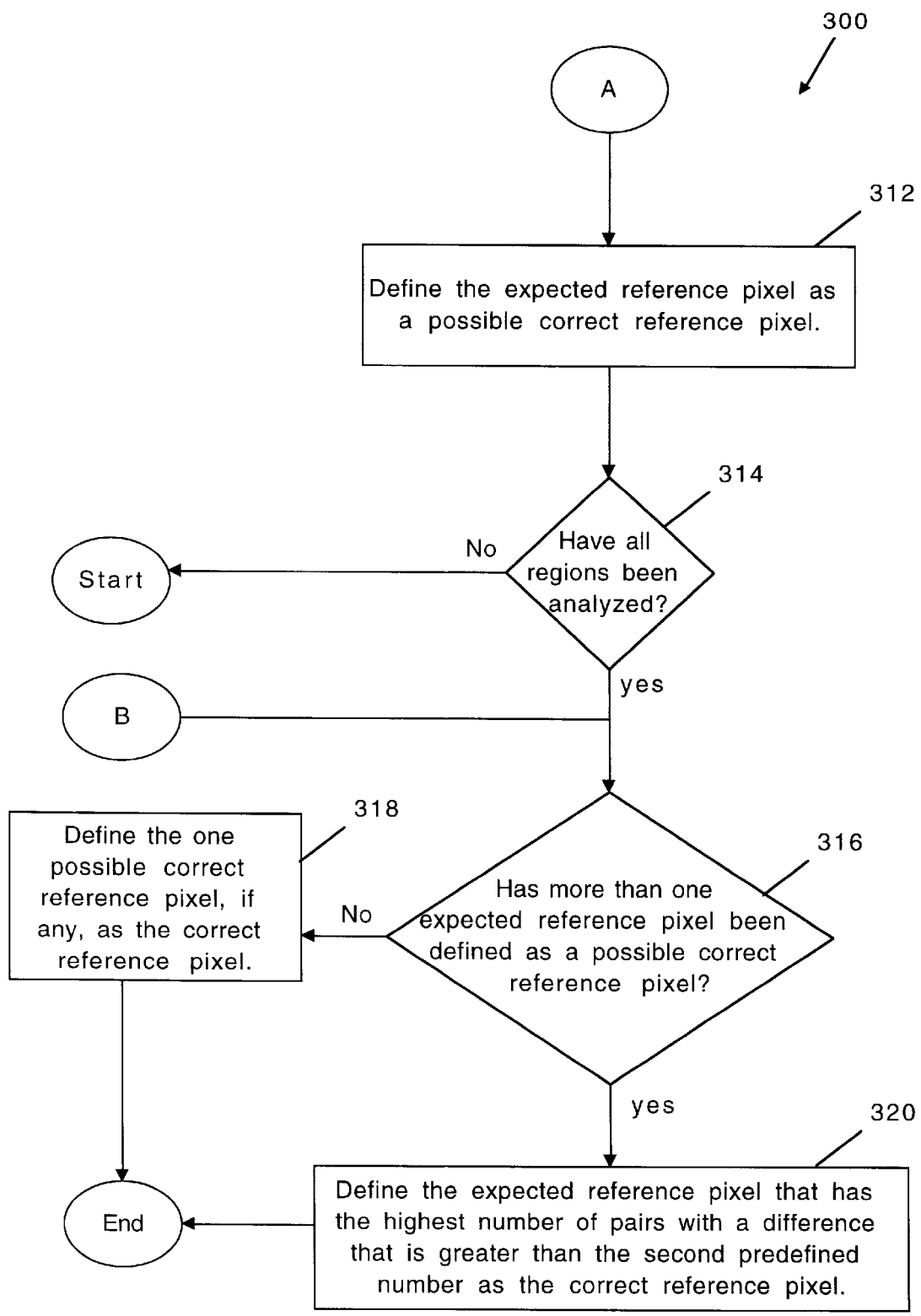

FIGS. 3A and 3B together form a flowchart illustrating a first pattern detection and selection method 300 in accordance with one embodiment of the present invention. This method may be used, for example, to find a correct reference pixel that represents a reference object within a coded object. The correct reference pixel may then be utilized for locating other features within the coded object (as well as the reference object), such as identification and orientation indicators. In the following embodiments (FIGS. 3 through 6), the correct reference pixel is a black pixel; of course, in other embodiments, the reference pixel may be a white pixel.

Initially, in operation 302 a region having an area that represents a known code pattern is defined. The region includes a plurality of paired pixels, which include a white pixel and a black pixel, and an expected reference pixel, which is a known black pixel. If the expected reference pixel is the correct reference pixel of the known coded object, a particular configuration of paired pixels will be present with respect to the expected reference pixel or correct reference pixel. For example, the pixel pairs may encircle the reference pixel as described below in reference to FIG. 7. Of course, the methods of the present invention may utilize any configuration of pixel pairs, and the utilized configuration may include any number of pixel pairs or be arranged in any shape with respect to the correct reference pixel.

In operation 304, a first pixel of a first pair is compared to an associated second pixel of the first pair. In operation 306, it is then determined whether all of the pixel pairs have been compared to the expected reference pixel. As previously discussed, any configuration of pixel pairs may be utilized by this method to determine the correct reference pixel for the known code pattern. Thus, the number of pixel pairs to be analyzed will vary with the particular coded object configuration and requirements of the application. For example, a high number of pairs may be selected to increase the likelihood of achieving a high level of accuracy If all of the pixel pairs have not been compared, the process returns to operation 304 and pixels from a second pixel pair are compared. Operation 304 is repeated for all pixel pairs.

After all pixel pairs have been compared, it is determined whether more than a first predefined number of first and second pixels of each pixel pair have a luminosity difference that is greater than a second predefined value in operation 312. In other words, it is determined whether a minimum number of pairs of black and white pixels are arranged in a particular configuration with respect to the expected reference pixel. Since one of the pixels in each pair is expected to be white and the other is expected to be black, the luminosity value difference between the pixels of a pair is expected to be significant for most pairs of pixels associated with the correct reference pixel. Thus, an expected reference pixel will be the correct reference pixel only when a large percentage of the pixels of each pair has a significant luminosity difference.

If more than a first predefined number of pixel pairs do not have a difference that is greater than a second predefined value, the process proceeds to operation 310 and it is determined whether all regions have been analyzed. In other words, other regions having other expected reference pixels may have to be analyzed to locate the correct reference pixel of the known code pattern.

If all of the regions have not been analyzed, the process returns to the start, operation 302, and another region is defined. If all of the regions have been analyzed, the process jumps to operation 316 to analyze any previous expected reference pixels that may have been defined as possible correct reference pixels. Operation 316 is described below and continued from reference "B" in FIG. 3B.

If more than the predefined number of pixel pairs have a difference that is greater than the first predefined value, the process proceeds to operation 312 (continued at "A" in FIG. 3B) and the expected reference pixel is defined as a possible correct reference pixel. Next, in operation 314 it is determined whether all of the regions have been analyzed. If all of the regions have not been analyzed, the process proceed back to the start, operation 302 and another region is defined. If all of the regions have been analyzed, it is determined whether more than one expected reference pixel has been defined as a possible correct reference pixel in operation 316.

If more than one expected reference pixel has been defined as a possible correct reference pixel, the expected reference pixel that is associated with the highest number of pairs that have a difference greater than the first predefined number is defined as the correct reference pixel of the known code pattern in operation 320. The process then ends after completion of operation 320.

If only one expected reference pixel has been defined as a possible correct reference pixel, it is defined as the correct reference pixel in operation 318. The process then ends after completion of operation 318.

Figure 4A:
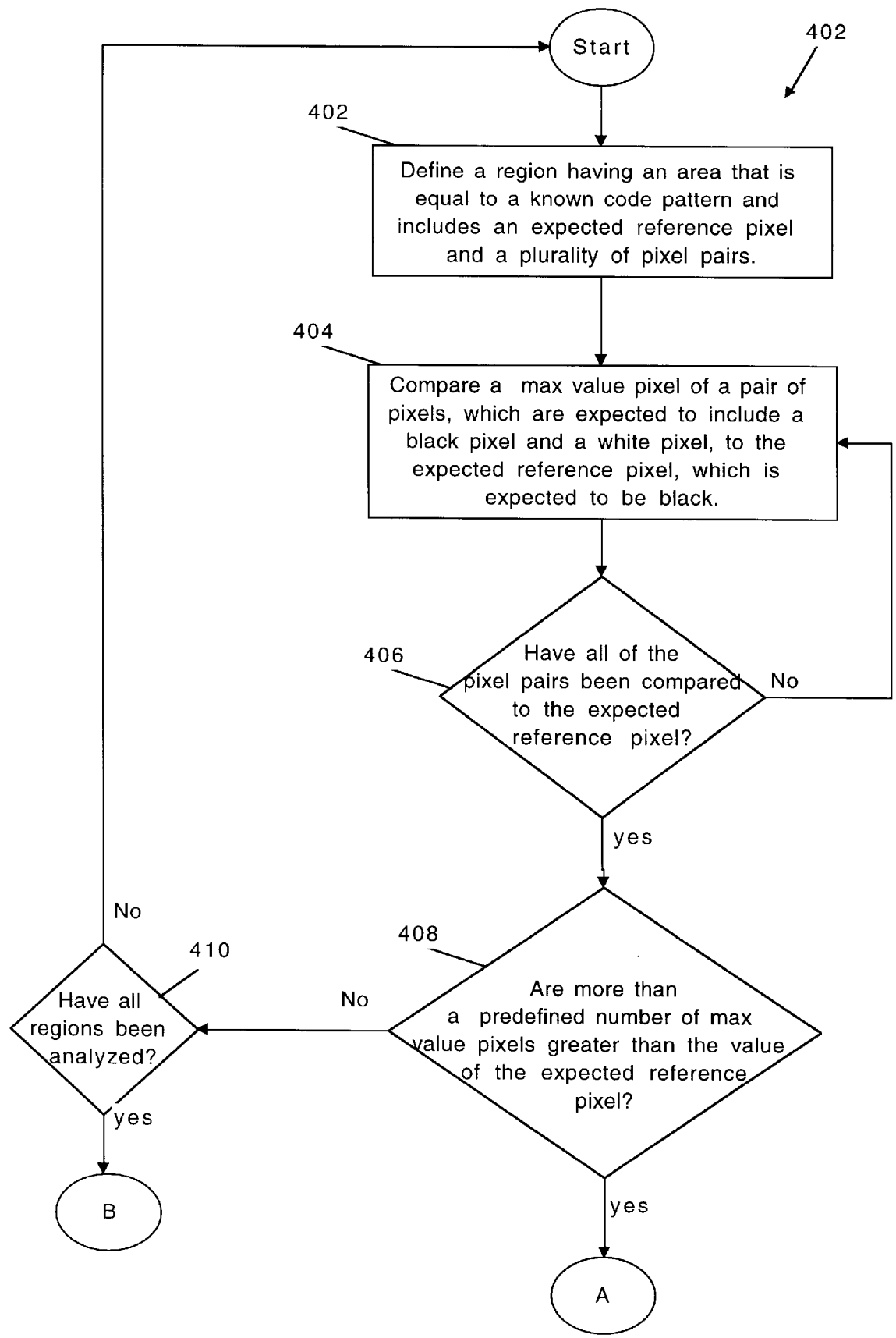
FIGS. 4A and 4B together form a flowchart illustrating a second pattern detection and selection method in accordance with an alternative embodiment of the present invention.
Figure 4B:
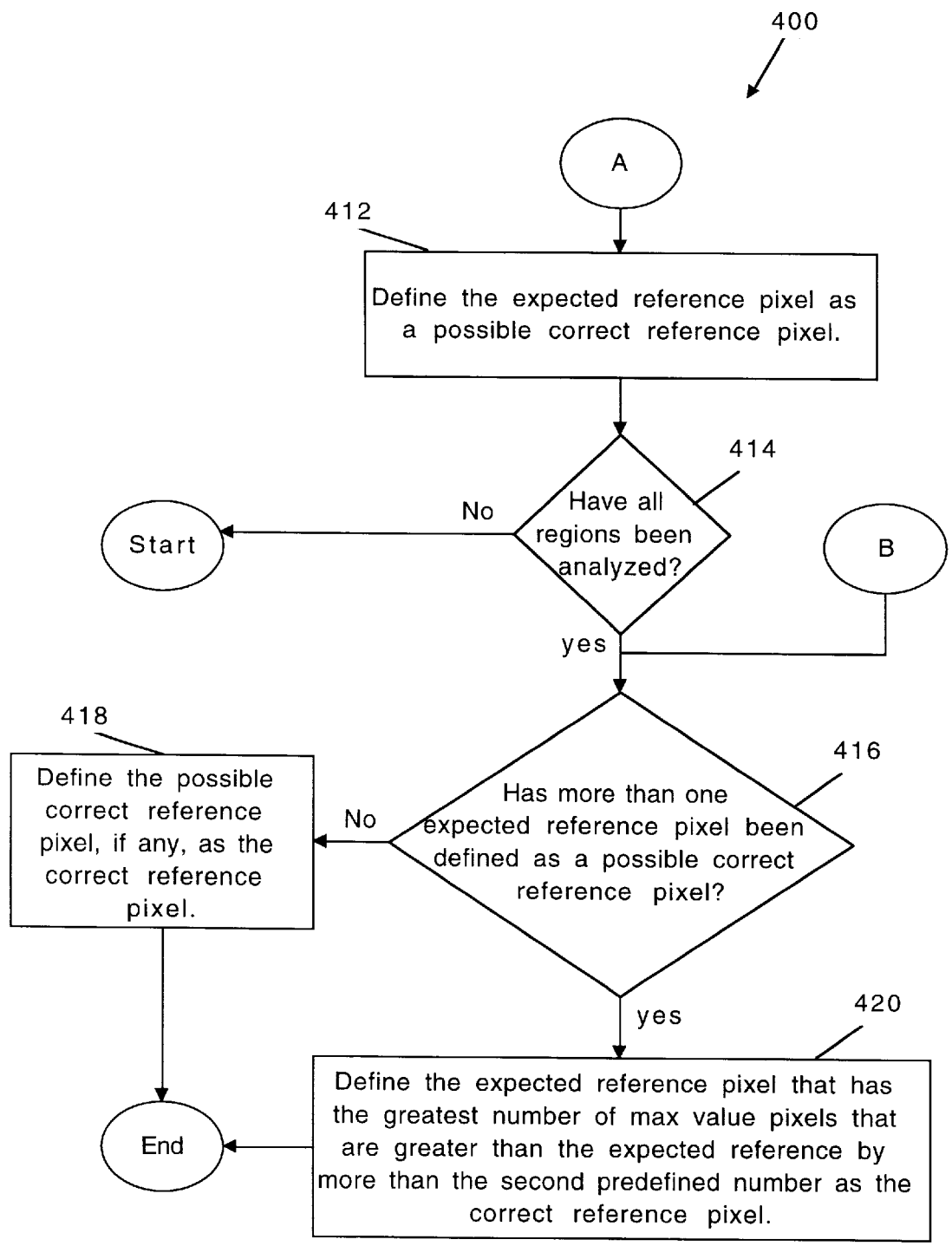

FIGS. 4A and 4B together form a flowchart illustrating a second pattern detection and selection method 400 in accordance with an alternative embodiment of the present invention. In operations 402 through 406, all pixel pairs are compared to the expected reference pixel.

After all pixel pairs have been compared to the expected reference pixel, it is determined whether more than a predefined number of pixels from each pixel pair that have a maximum luminosity value have a greater luminosity value than the luminosity value of the expected reference pixel in operation 408. In contrast to the methods of FIGS. 3A and 3B, the methods of FIGS. 4A and 4B are contrast independent. That is, the methods illustrated in FIGS. 3A and 3B use absolute luminosity values by checking whether the contrast difference between two pixels in each pair is greater than a predetermined amount, while the methods illustrated in FIGS. 4A and 4B use relative luminosity values by checking whether the brightest pixel in each pair has a luminosity value that is greater than the expected reference pixel's luminosity value. In sum, since the methods illustrated in FIGS. 4A and 4B are contrast independent, they are preferred over the methods in FIGS. 3A and 3B.

If more than a predefined number of maximum luminosity values from the pixel pairs are not greater than the luminosity value of the expected reference pixel, the process proceeds to operation 410 and it is determined whether all regions have been analyzed.

If all of the regions have not been analyzed, the process returns to the start, operation 402, and another region is defined. If all of the regions have been analyzed, the process jumps to operation 416 to analyze any previous expected reference pixels that may have been defined as possible correct reference pixels. Operation 416 is described below and continued from reference "B" in FIG. 4B.

If more than a predefined number of maximum luminosity values from the pixel pairs are greater than the luminosity value of the expected reference pixel, the process proceeds to operation 412, which operation is continued from reference "A" in FIG. 4B. In operation 412, the expected reference pixel is defined as a possible correct reference pixel.

Next, in operation 414 it is determined whether all of the regions have been analyzed. If all of the regions have not been analyzed, the process proceed back to the start, operation 402, and another region is defined. If all of the regions have been analyzed, it is determined whether more than one expected reference pixel has been defined as a possible correct reference pixel in operation 416.

If more than one expected reference pixel has been defined as a possible correct reference pixel, the expected reference pixel that is associated with the highest number of pairs that have a pixel that has a maximum luminosity value that is greater than the expected reference pixel's luminosity value is defined as the correct reference pixel of the known code pattern in operation 420. The process then ends after completion of operation 420.

If only one expected reference pixel has been defined as a possible correct reference pixel, it is defined as the correct reference pixel in operation 418. Of course, if no expected reference pixels have been defined as a possible correct reference pixel, none of the expected reference pixels are defined as the correct reference pixel and the process then ends.

Figure 5A:
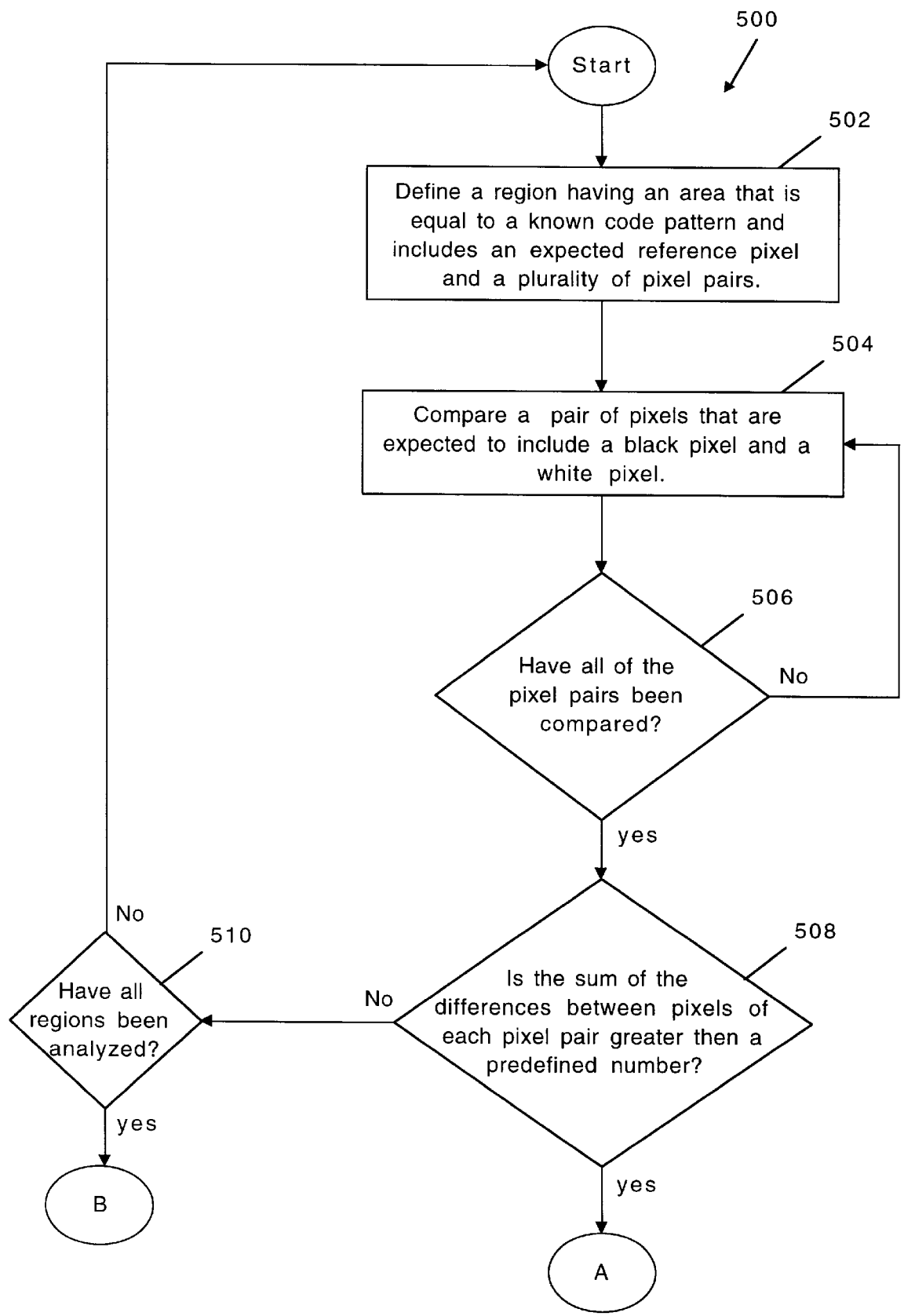
FIGS. 5A and 5B together form a flowchart illustrating a third pattern detection and selection method in accordance with an alternative embodiment of the present invention.
Figure 5B:
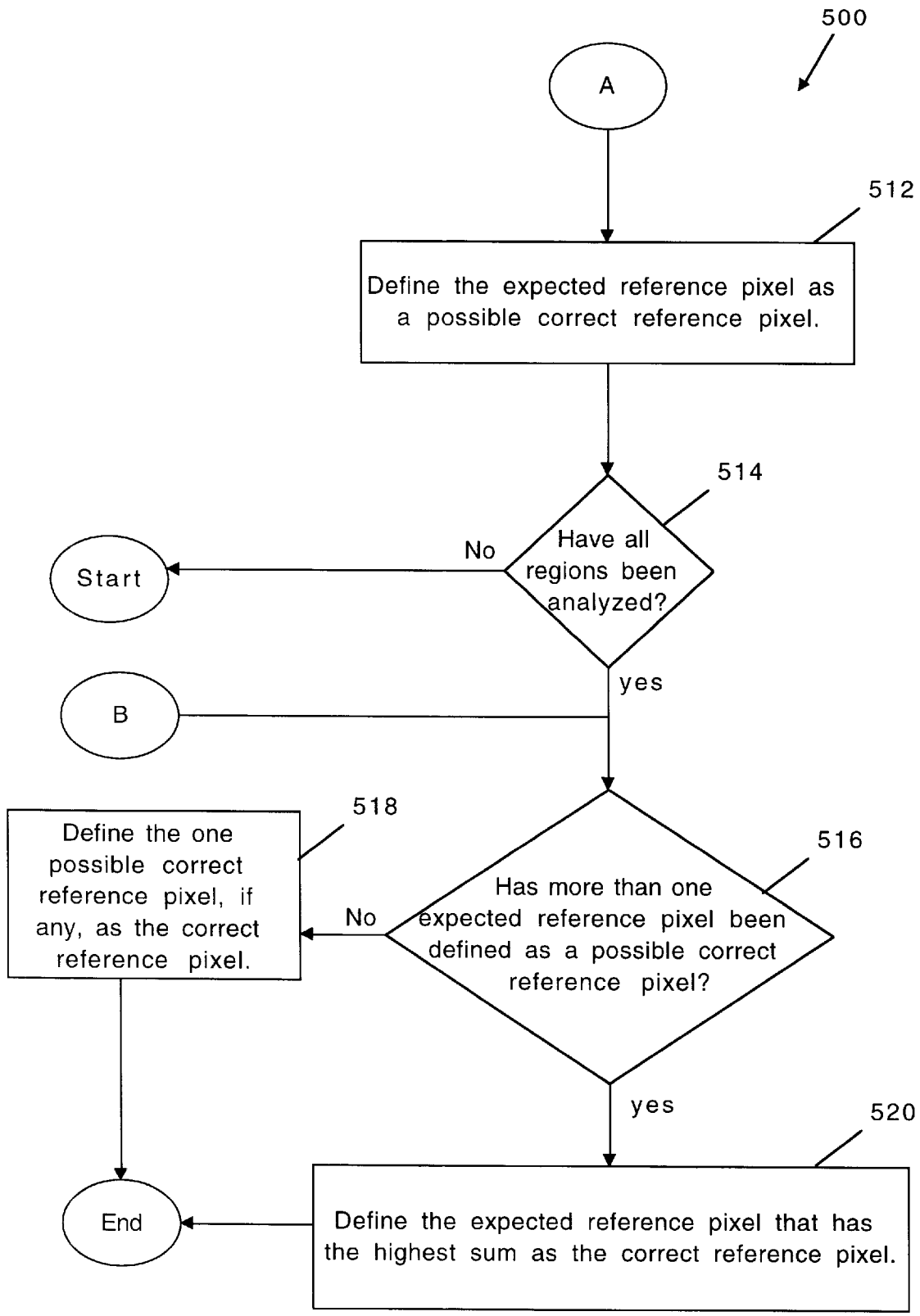

FIGS. 5A and 5B together form a flowchart illustrating a third pattern detection and selection method 500 in accordance with an alternative embodiment of the present invention. Operations 502 through 506 are similar to operations 302 through 306, and are for comparing all pixels within all pixel pairs.

After all pixel pairs have been compared, it is determined whether a sum of the luminosity differences of pixels from each pixel pair is greater than a predefined value in operation 508. Like the methods of FIGS. 3A and 3B, the methods of FIGS. 5A and 5B are contrast dependent. That is, the methods illustrated in FIGS. 4A and 4B use absolute luminosity values by checking whether the sum of the contrast differences between the pixels in each pair is greater than a predetermined amount.

If the sum of the luminosity differences of pixels from each pixel pairs is not greater than a predefined value, the process proceeds to operation 510 and it is determined whether all regions have been analyzed.

If all of the regions have not been analyzed, the process returns to the start, operation 502, and another region is defined. If all of the regions have been analyzed, the process jumps to operation 516 to analyze any previous expected reference pixels that may have been defined as possible correct reference pixels. Operation 516 is described below and continued from reference "B" in FIG. 5B.

If the sum of the luminosity differences of pixels from each pixel pairs is greater than a predefined value, the process proceeds to operation 512, which operation is continued from reference "A" in FIG. 5B. In operation 512, the expected reference pixel is defined as a possible correct reference pixel.

Next, in operation 514 it is determined whether all of the regions have been analyzed. If all of the regions have not been analyzed, the process proceed back to the start, operation 502, and another region is defined. If all of the regions have been analyzed, it is determined whether more than one expected reference pixel has been defined as a possible correct reference pixel in operation 516.

If more than one expected reference pixel has been defined as a possible correct reference pixel, the expected reference pixel that is associated with the highest sum is defined as the correct reference pixel of the known code pattern in operation 520 and the process then ends.

If only one expected reference pixel has been defined as a possible correct reference pixel, that one reference pixel is defined as the correct reference pixel in operation 518. Of course, if no expected reference pixels have been defined as a possible correct reference pixel, none of the expected reference pixels are defined as the correct reference pixel. The process then ends after completion of operation 518.

Figure 6A:
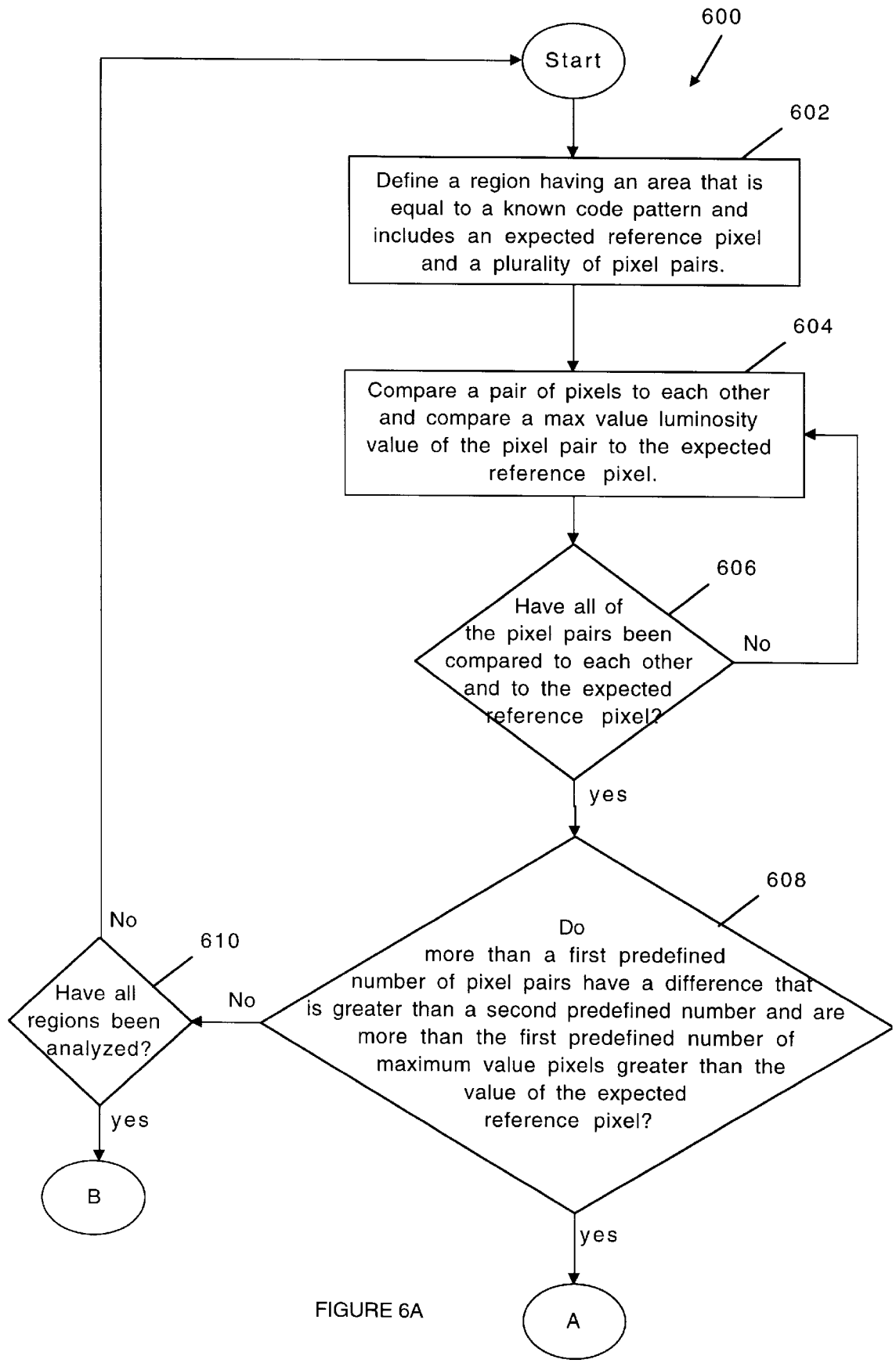
FIGS. 6A and 6B together form a flowchart illustrating a fourth pattern detection and selection method in accordance with an alternative embodiment of the present invention.
Figure 6B:
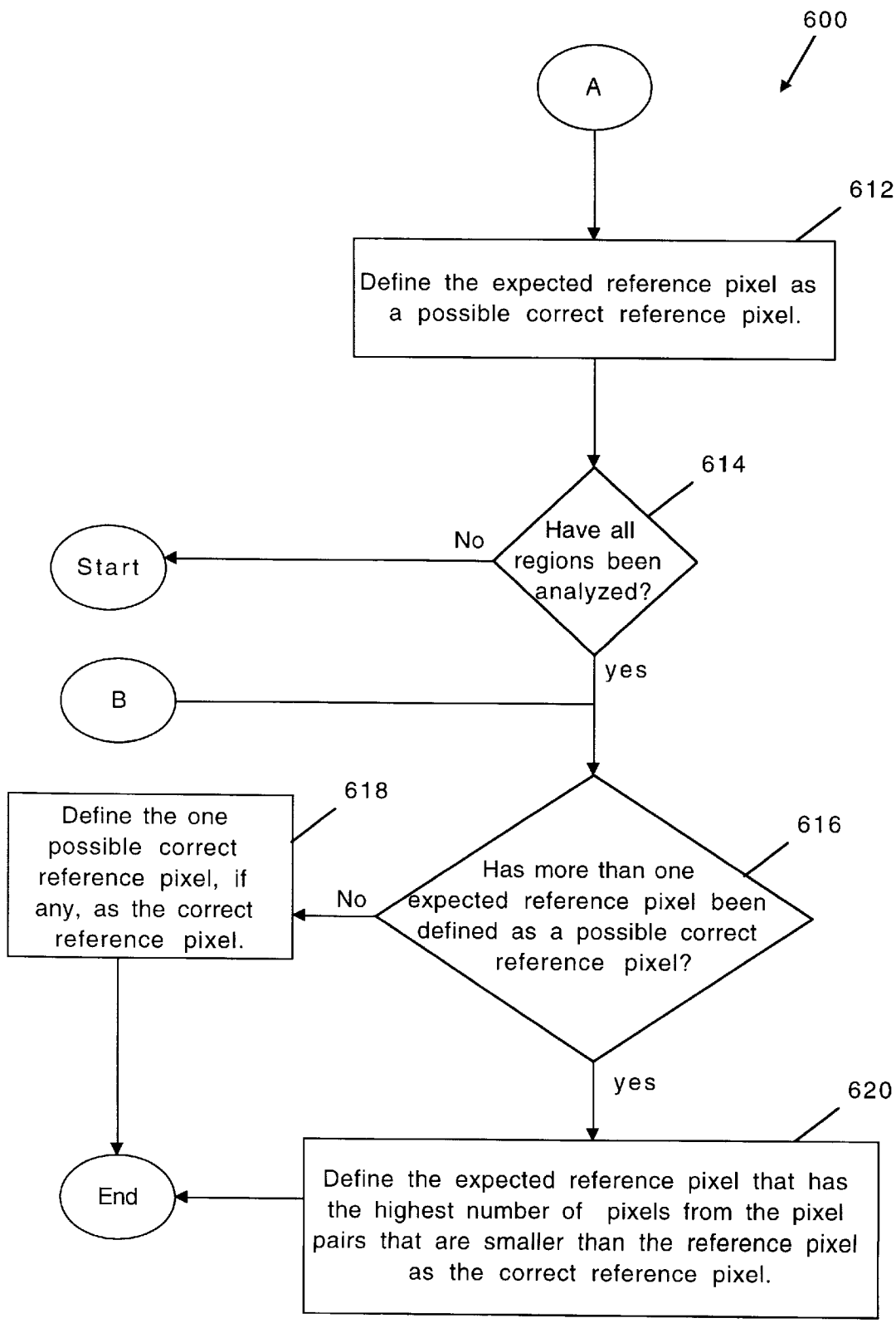

FIGS. 6A and 6B together form a flowchart illustrating a fourth pattern detection and selection method 600 in accordance with an alternative embodiment of the present invention. Operations 602 through 606 are similar to operations 402 through 406, and are for comparing all pixel pairs to the expected reference pixel.

After all pixel pairs have been compared to the expected reference pixel, in operation 608 it is determined whether more than a first predefined number of pixel pairs have a difference that is greater than a second predefined number. Additionally, in operation 608 it is determined whether there are more than the first predefined number of pixel pairs that have a maximum luminosity value that is greater than the luminosity value of the expected reference pixel. In sum, this method 600 includes the methods 300 and 400 illustrated in FIGS. 3A, 3B, 4A, and 4B.

If the conditions of operation 608 are not met, the process proceeds to operation 610 and it is determined whether all regions have been analyzed.

If all of the regions have not been analyzed, the process returns to the start, operation 602 and another region is defined. If all of the regions have been analyzed, the process jumps to operation 616 to analyze any previous expected reference pixels that may have been defined as possible correct reference pixels. Operation 616 is described below and continued from reference "B" in FIG. 6B.

If the conditions of operation 608 are met, the process proceeds to operation 612, which operation is continued from reference "A" in FIG. 6B. In operation 612, the expected reference pixel is defined as a possible correct reference pixel.

Next, in operation 614 it is determined whether all of the regions have been analyzed. If all of the regions have not been analyzed, the process proceed back to the start, operation 602, and another region is defined. If all of the regions have been analyzed, it is determined whether more than one expected reference pixel has been defined as a possible correct reference pixel in operation 616.

If more than one expected reference pixel has been defined as a possible correct reference pixel, the expected reference pixel that is associated with the highest sum is defined as the correct reference pixel of the known code pattern in operation 620. The process then ends after completion of operation 620.

If only one expected reference pixel has been defined as a possible correct reference pixel, it is defined as the correct reference pixel in operation 618. Of course, if no expected reference pixels have been defined as a possible correct reference pixel, none of the expected reference pixels are defined as the correct reference pixel and the process then ends.

Some of the above described operations (e.g., 314 through 320 of FIG. 3) are implemented to select a correct reference pixel from a group of possible reference pixel candidates. These operations are optional, and depend on the particular requirements of the application. For example, if the code pattern has a fixed location, the location of the reference pixel may be known. However, one may wish to determine whether the code pattern is present by determining whether the reference pixel is present, along with its associated pixel pairs. In other words, one may simply implement operations (e.g., 302 through 312) to detect the location of the correct reference pixel that represents the reference object of the coded object.

Several coded object configurations would work well with the above detection and selection methods described in reference to FIGS. 3 through 6. For example the coded object may include a black reference that is surrounded by pairs of black and white regions. Alternatively, the coded object may include a white reference object as described above in reference to FIGS. 3 through 6. The region pairs may be configured in any number of suitable forms for detecting the location of the reference object. Preferably, the pixel regions are also utilized for other purposes, such as identification and/or orientation purposes.

Figure 7:
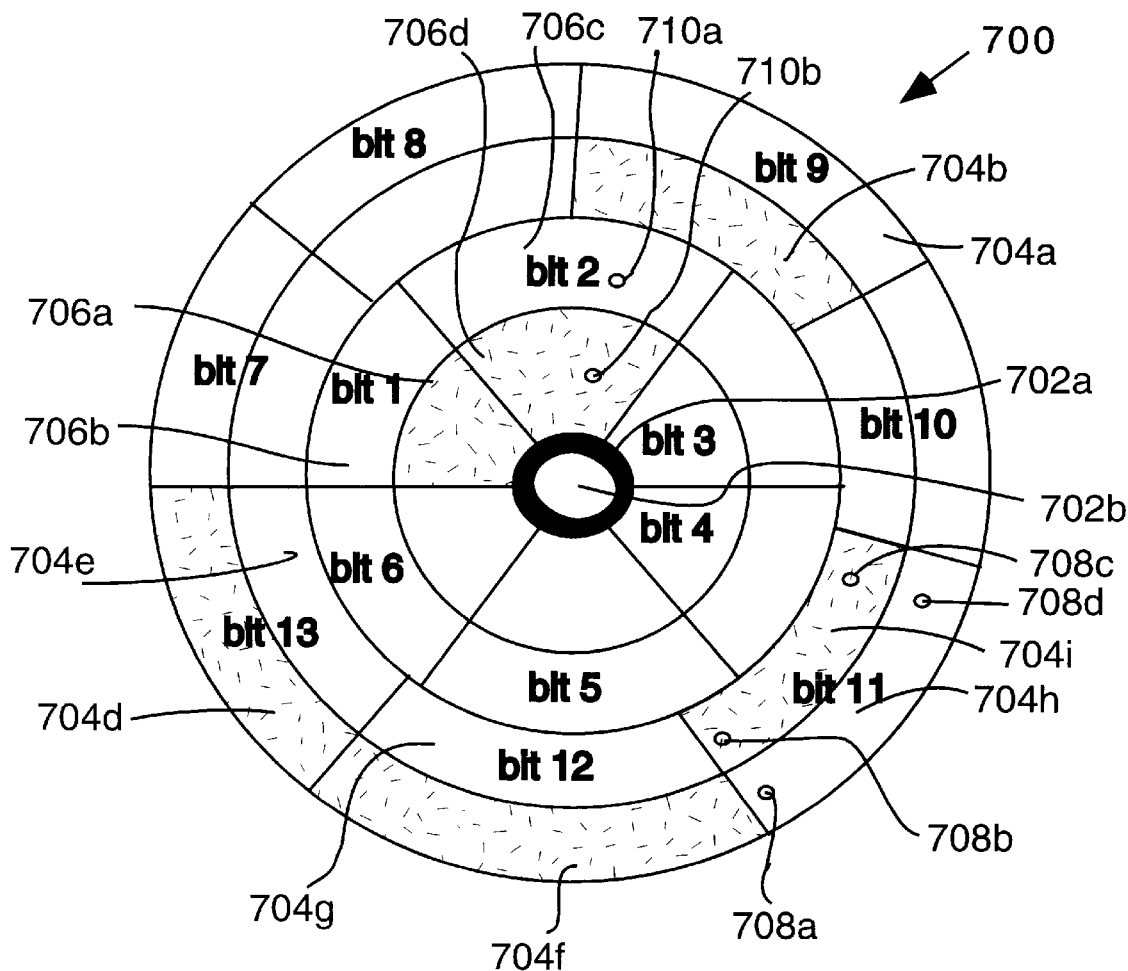
FIG. 7 is a coded object in accordance with one embodiment of the present invention.

FIG. 7 is a coded object 700 in accordance with one embodiment of the present invention. The coded object 700 includes a plurality of inner bits 1 through 6, a plurality of outer bits 7 through 13, and a reference object 702. The reference object 702 may be any suitable shape, size, or color, that is detectable using the methods of FIGS. 3 through 6. As shown, the reference object 702 includes a white reference circle 702b that is preferably surrounded by a black ring 702a. The black ring 702a isolates the white reference circle 702b and helps to prevent uneven blurring around the edge of the white reference circle 702b due to uneven color patterns disposed around the edge of the white reference circle 702b.

One or more bits (e.g., bit 9) may be configured to have a black portion (e.g., 704b) and a white portion (e.g., 704a). Preferably, the relative arrangements of the black and white portions may be used to identify the coded object 700. For example, if the inner portion of bit 9 is darker than the outer portion (e.g., 704a), bit 9 is equal to zero, and if the inner portion is lighter, bit 9 is equal to "1".

Although not shown and not required, in this embodiment all of the bits may have a black and white portion. Methods for determining the identification of each bit are described by Vescovi, et al., which is incorporated herein by reference above.

When the white reference circle 702b is scanned into an image, one or more expected reference pixels may be possible candidates for the correct reference pixel (e.g., a pixel that most closely corresponds to a center of the reference circle). In other words, one of these expected reference pixels is the correct reference pixel. The correct reference pixel may be used to detect whether the coded object 709 is present and to detect the relative positions of the bits (e.g., 704 and 706). That is, after the correct reference pixel 702 is located using any of the methods described above in reference to FIGS. 3 through 6, the bit positions may then be determined based on the correct reference pixel's position. The bits may then be used to identify the coded object 700. The correct reference pixel, along with a particular bit, may also be used to detect the orientation of the coded object.

Of course, any suitable configurations may be used for the bits, and reference object 702, as long as the coded object may be tracked using the tracking methods of the present invention. For example, the reference object 702 may be positioned within the center of the coded object 700.

The detection and selection method of FIGS. 4A and 4B will now be described in reference to the coded object 700 of FIG. 7. However, slight modifications to this method are required to apply this method to a white reference object 702, as opposed to a black reference object as described above in reference to FIGS. 4A and 4B.

In general terms, the expected reference pixels that may correspond to the center of the coded object 700 are analyzed to determine which is the correct reference pixel. After the correct reference pixel is found, the location of each bit (e.g., bits 1 through 13) may be determined relative to the reference pixel 702. That is, one of the expected reference pixels (the correct reference pixel) will be positioned at a particular location relative to the bits.

Since the bits are located in a particular configuration around the reference pixel 702, the correct reference pixel may be found by determining which expected reference pixel is associated with the particular configuration of bits. In other words, it is known that the correct reference pixel will be encircled by a plurality of black and white portions. Using the method described in FIGS. 4A and 4B, initially in operation 402, a region is defined that includes a plurality of pixel pairs and the expected reference pixel. The pixel pairs may be defined in any suitable manner, depending on the requirements of the particular application. For example, the pixel pairs may include a pair from each bit, a pair from a few bits, or a plurality of pair from each bit. Preferably, a plurality of pixel pairs are chosen from each bit portion, and the pixel pairs encircle the expected reference pixel through a radial center of the bit portions.

As shown, the pixel pairs define an outer ring 708 that encircles the expected pixel and are expected to encompass a portion of the outer bits 704 such that each pixel pair includes a black pixel (e.g., 708*b*) from one of the black portions (e.g., 704*i*) and a white pixel (e.g., 708*a*) from one of the white portions (e.g., 704*h*) of an outer bit (e.g., bit 11). As shown, another pixel pair includes a black pixel 708*c* and a white pixel 708*d* from bit 11. Thus, bit 11 has two associated pixel pairs. Additionally, the pixel pairs may also define an inner ring 710 that encompasses a portion of the inner bits 706 such that each pixel pair is expected to include a black pixel (e.g., 710*b*) from one of the black portions (e.g., 706*d*) and a white pixel (e.g., 710*a*) from one of the white portions (e.g., 706*c*) of an inner bit (e.g., bit 2).

In operation 404, the minimum luminosity value of each pixel pair is compared to the luminosity value of the expected reference pixel. For example, for a pixel pair that includes the black portion 704*b* and the white portion 704*a*, the minimum luminosity value will be the black portion 704*a*. In operation 408, it is determined whether a predefined number of minimum luminosity values are lower than the luminosity value of the expected reference pixel. If the expected reference pixel is the correct reference pixel, a relatively high percentage of the pixel pairs will have a minimum luminosity value pixel that is lower than the luminosity value of the expected reference pixel. That is, the pixel pairs surrounding the correct reference pixel would be expected to include a black and a white pixel and the correct reference pixel would be expected to be a white pixel.

Figure 8:
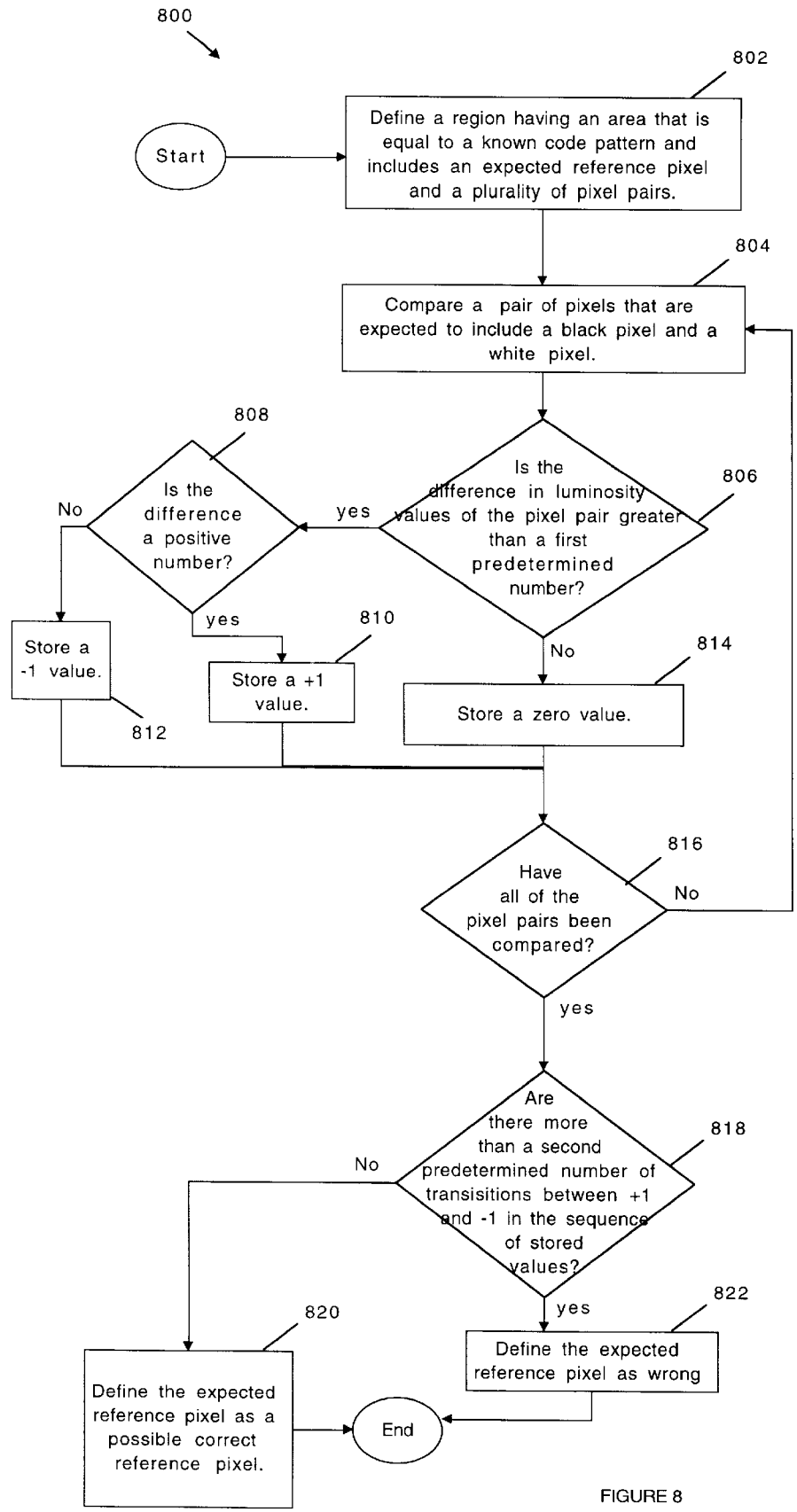
FIG. 8 is a flowchart illustrating a fifth pattern detection and selection method that includes operations for detecting transitions between black and white in accordance with an alternative embodiment of the present invention.

FIG. 8 is a flowchart illustrating a fifth pattern detection and selection method 800 that includes operations for detecting transitions between black and white in accordance with an alternative embodiment of the present invention. The method 800 may be implemented prior to any of the methods of FIGS. 3 through 6 to quickly determine whether the expected reference pixel is not the correct reference pixel and to skip the methods of FIGS. 3 through 6. Alternatively, the method of FIG. 8 may be used to double check any of the methods of FIGS. 3 through 6. Of course, the following method may be used exclusively to determine whether the expected reference pixel is the correct reference pixel.

Initially, in operation 802, a region is defined having an area that is equal to a known code pattern and includes a plurality of pixel pairs and an expected reference pixel. For example, the coded object 700 of FIG. 7 may have a region defined that includes the outer ring 708 and/or the inner ring 710. Each pixel pair (e.g., 708*a* and 708*b*) is expected to include a black pixel from a black portion (e.g., 704*i*) and a white pixel from the white portions (e.g., 704*h*) of a particular bit (e.g., bit 11).

Depending on the number of bits within the coded object 700, as each pixel is sequentially analyzed, a maximum number of transitions from a black pixel to a white pixel, or visa versa, is expected. For example, if the region is defined as the outer circle 708 of the coded object in FIG. 7, there a maximum of 6 transitions around the outer circle 708 since the outer circle includes 7 bits that may alternate black and white. Thus, operations 804 through 806 may be implemented to check whether more than 6 transitions occur.

First, luminosity values of each pixel pair are compared in operation 804. Basically, a "sign description" method is then utilized to sequentially represent the relative luminosity values within the region. That is, a pixel pair is given a +1, 0, or −1 value, depending on the relative location of the black and white portions. For example, if a first pixel of the pixel pair is white and a second pixel is black, the pixel pair is represented with a +1 value. If the first pixel is black and the second pixel is white, the pixel pair is represented with a −1 value. A pixel pair that doesn't have a minimum contrast may be represented with a 0, which pixel pair may fall within a transition area. A next pixel pair in the region is then given a +1, 0, or −1 value based on relative luminosity values. This "sign description" method is repeated sequentially for all pixel pairs within the region.

Operation 806 through 814 illustrate a "sign description" method in accordance with one embodiment of the present invention. In operation 806, it is determined whether the difference in luminosity's is greater in magnitude than a first predetermined value. If the difference is not greater, a zero value is stored in operation 814.

If the difference is greater, it is then determined whether the difference is a positive number or a negative number in operation 808. If the difference is positive, a +1 value is stored in operation 810; otherwise, a −1 is stored in operation 812.

After a 0, −1, or +1 value is stored, it is then determined whether all pixel pairs in the region have been analyzed in operation 816, and operations 804 through 816 are repeated for all remaining pixel pairs. A 0, −1, or +1 value is stored for each pixel pair. The 0, −1, and +1 values may be sequentially stored in any suitable sequential data structure or variable, such as an array. After all pixel pairs are analyzed, it is determined whether more than a second predetermined number of transitions between −1 and +1, or visa versa, have occurred for the sequence of stored values in operation 818.

If there are more than a first predetermined number of transitions, the expected reference pixel is defined as a wrong reference pixel and the process 900 ends. If there are not more than a first predetermined number of transitions, the expected reference pixel is defined as a possible reference pixel in operation 820 and the process 900 ends. The possible reference pixel may either be defined as the correct reference pixel or may be further analyzed with the methods of FIGS. 3 through 6, for example.

Figure 9:
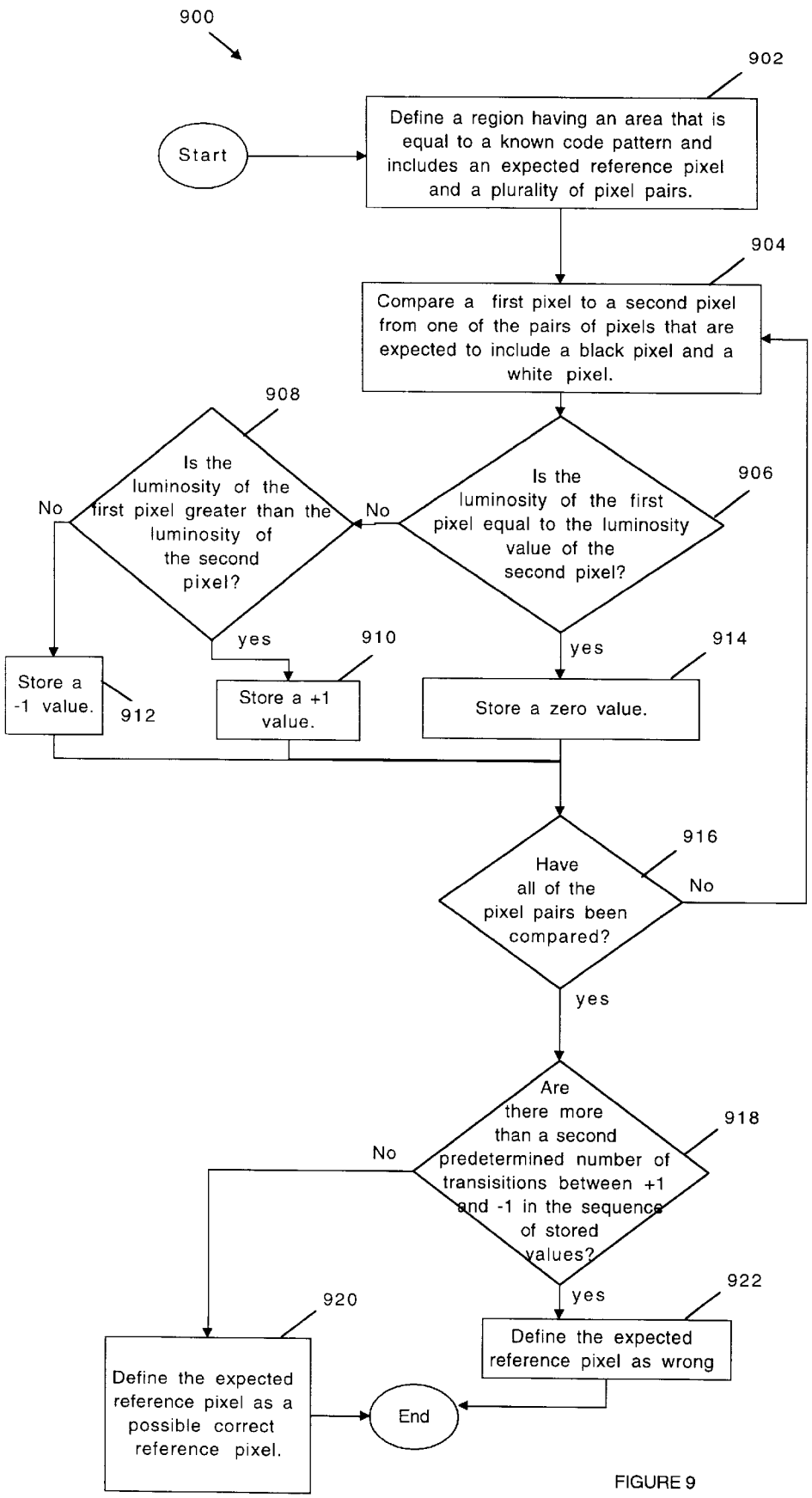
FIG. 9 is a flowchart illustrating a sixth pattern detection and selection method that includes operations for detecting transitions between black and white in accordance with an alternative embodiment of the present invention.

FIG. 9 is a flowchart illustrating a fifth pattern detection and selection method 900 that includes operations for detecting transitions between black and white in accordance with an alternative embodiment of the present invention. In contrast to the transition detection method 800 of FIG. 8, the method 900 of FIG. 9 is contrast independent.

Initially, in operation 902, a region is defined having an area that is equal to a known code pattern and includes a plurality of pixel pairs and an expected reference pixel. Each pixel pair has a first pixel and a second pixel. As in the previous example, the coded object 700 of FIG. 7 has a region defined that includes the outer ring 708 and/or the inner ring 710. Each pixel pair (e.g., 708a and 708b) includes a black pixel from a black portion (e.g., 704i) and a white pixel from the white portions (e.g., 704h) of a particular bit (e.g., bit 11).

After the region is defined, luminosity values of each pixel pair are compared in operation 904. Operation 906 through 914 illustrate a "sign description" method in accordance with an alternative embodiment of the present invention. In operation 906, it is determined whether the luminosity of the first pixel equals to the luminosity of the second pixel. If the luminosity's are equal, a zero value is stored in operation 914. If the luminosity's are not equal, it is then determined whether the luminosity of the first pixel is greater than the luminosity of the second pixel. If the luminosity of the first pixel is greater, a +1 value is stored in operation 910; otherwise, a −1 is stored in operation 912.

After a 0, −1, or +1 value is stored, it is then determined whether all pixel pairs in the region have been analyzed in operation 916, and operations 904 through 916 are repeated for all remaining pixel pairs. After all pixel pairs are analyzed, it is determined whether more than a first predetermined number of transitions between −1 and +1, or visa versa, have occurred for the sequence of stored values in operation 918.

If there are more than a first predetermined number of transitions, the expected reference pixel is defined as a wrong reference pixel in operation 922 and the process 900 ends. If there are not more than a first predetermined number of transitions, the expected reference pixel is defined as a possible reference pixel in operation 920 and the process 900 ends. The possible reference pixel may either be defined as the correct reference pixel or may be analyzed further with the methods of FIGS. 3 through 6, for example.

In an alternative embodiment, the coded object may include an angle object for determining the orientation of the coded object. For example, one of the bit regions of the coded object may be utilized as the angle object. The angle object may have two dark portions, instead of a dark and a white portion of a bit. Thus, the angle object may be located by determining which pixel pairs result in the lowest luminosity total (black+black), or by determining which pixel pairs have the lowest contrast difference (black−black). Additionally, one of the dark portions of the angle object may include a white mark to increase precision of determining the orientation of the coded object.

Alternatively, the orientation may be determined without using a dedicated bit. In this embodiment, the bits of the coded object are configured such that the number of inner bits and outer bits are mutually prime. That is, only one bit boundary from an inner bit would substantially line up with an outer bit boundary. As shown, the bits of the coded object 700 are mutually prime. For example, an outer bit boundary between bits 7 and 13 substantially aligns with only one inner bit boundary, between inner bits 1 and 6. In sum, this substantially aligned inner and outer bit boundary may be used as an angle object for detecting the orientation and relative bit locations of the coded object 700.

Any suitable method may be implemented for detecting this alignment. For example, the alignment may be detected by comparing the transition points within the outer circle 708 to the transition points of the inner circle 710. The aligned boundary where the transition points substantially match is defined as the correct angle point.

Figure 10:
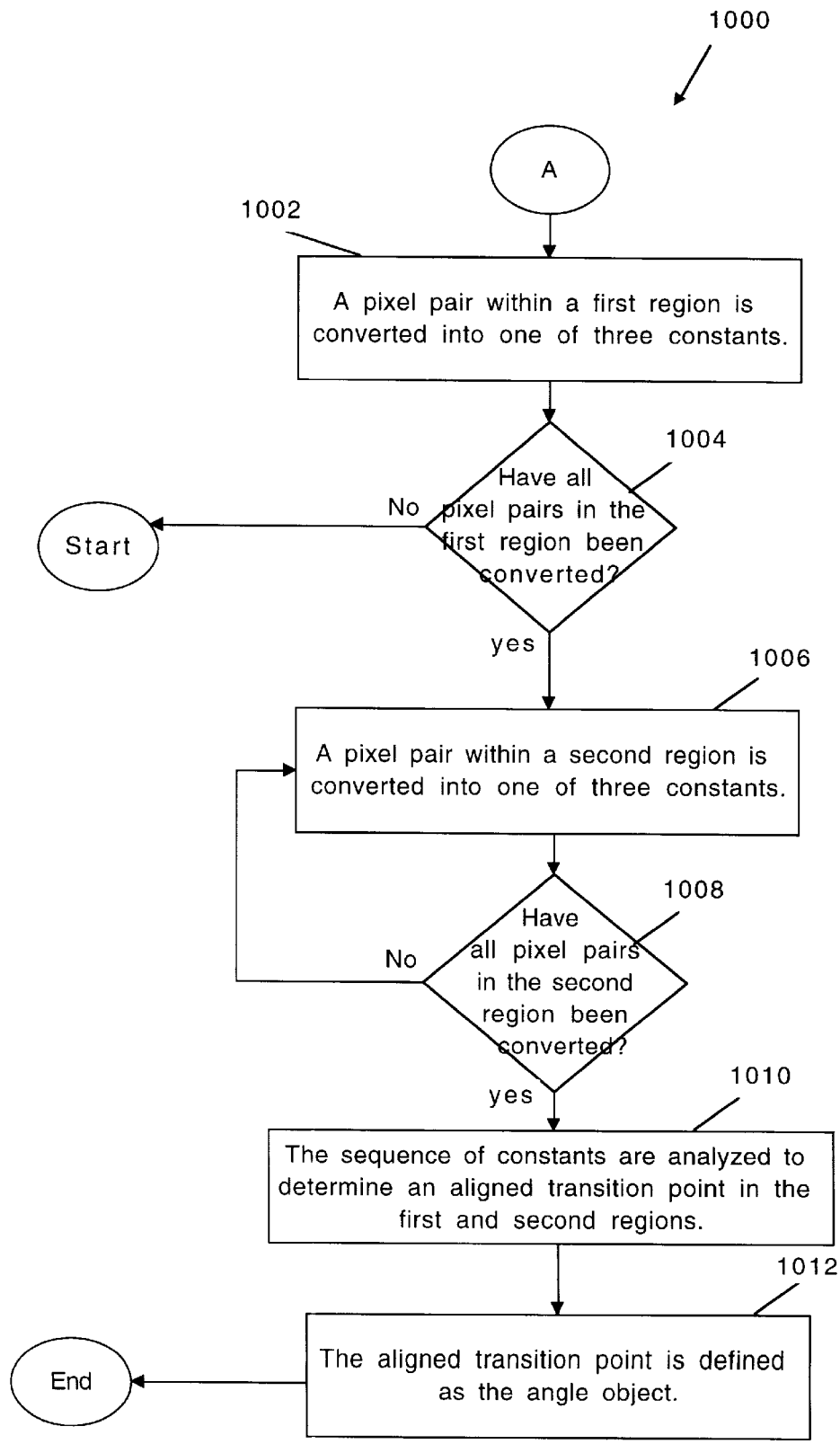
FIG. 10 is a flowchart illustrating an angle object detection method that includes operations for detecting and matching transitions of black and white from a first region and a second region in accordance with one embodiment of the present invention.

FIG. 10 is a flowchart illustrating an angle object detection method 1000 that includes operations for detecting and matching transitions of black and white from a first region (e.g., 708 of FIG. 7) and a second region (e.g., 710 of FIG. 7) in accordance with one embodiment of the present invention. In this embodiment, a transition must occur between bits 7 and 13 and bits 1 and 6. That is, bit 7 must have a different relative placement of the black and white portion than bit 13, and bit 1 must have a different relative placement of the black and white portion than bit 6.

Initially, in operation 1002, a pixel pair within the first region is converted into one of three constants that signifies the relative placement of a black and white pixel of the pixel pair. Next, it is determined whether all pixel pairs of the first region have been converted into one of three constants in operation 1004. Operation 1002 is repeated if all pixel pairs have not been converted. Otherwise, the method 1000 proceeds to operation 1006.

In operation 1006, a pixel pair within the second region is converted into one of three constants that signifies the relative placement of a black and white pixel of the pixel pair. Next, it is determined whether all pixel pairs of the second region have been converted into one of three constants in operation 1008. Operation 1006 is repeated if all pixel pairs have not been converted. Otherwise, the method 1000 proceeds to operation 1010.

The pixel pairs are converted by implementing any in any suitable technique for representing transitions between black and white. For example, either of the "sign description" methods described above in reference to FIGS. 8 and 9 may be implemented, wherein each pixel pair is converted into one of the constants +1, 0, or −1.

After all pixel pairs are converted within the first and second regions, the constants are analyzed to determined where the first and second regions have a substantially aligned transition point in operation 1012. For example, for a sign description representation, a transition between −1 and +1, or visa versa, from the first region would align with a transition between −1 and +1, or visa versa, from the second region. The substantially aligned transition point is then defined as the angle object in operation 1014, and the process 1000 ends.

Figure 11:
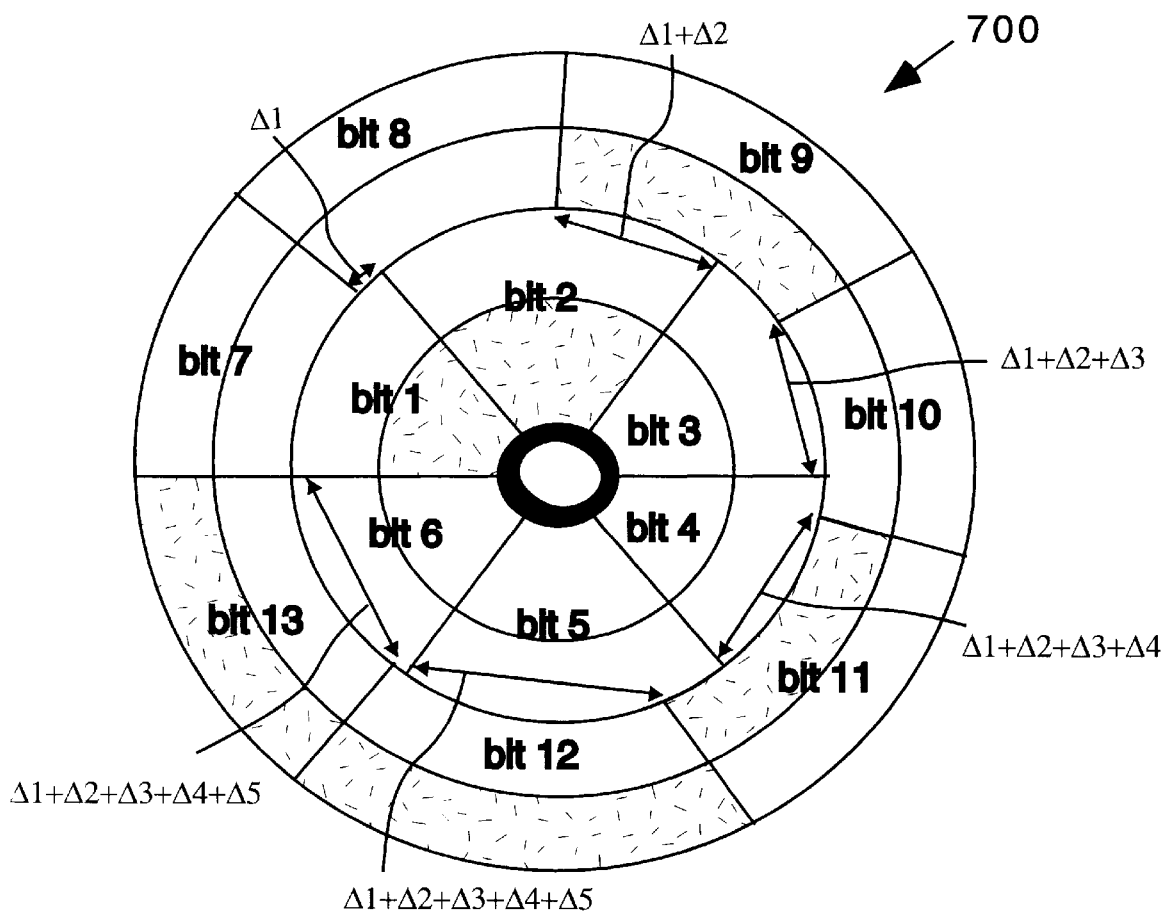
FIG. 11 is a diagrammatic representation of relative angles between each bit of the inner bits and an adjacent bit of the outer bit within the coded object of FIG. 7.

An alternative angle object detection method that includes operations for detecting and matching transitions of black and white from a first region (e.g., 708 of FIG. 7) and a second region (e.g., 710 of FIG. 7) will now be described in reference to FIG. 11. FIG. 11 is a diagrammatic representation of relative angles between each outer boundary of the outer bits and an adjacent inner boundary of the inner bits within the coded object 700 of FIG. 7.

As shown, the coded object 700 of FIG. 11 includes a plurality of inner bits 1 through 6 and a plurality of outer bits 7 through 13. Although not shown for each bit, each bit will include a black portion and a white (e.g., 704b and 704a, respectively, of FIG. 7). For this embodiment, at least one bit of the inner bits must have a different relative location for the black and white portions from the other inner bits. For example, a first inner bit may have a black inner portion and a white outer portion, while at least one other inner bit will have a white inner portion and a black outer portion. Likewise, at lease one bit of the outer bits must have a different relative location for the black and white portions from the other outer bits.

The number of bits in each circle is known. For example, there are 6 bits of the inner bits and 7 bits of the outer bits within the coded object 700 of FIG. 7. The relative distance or angle between bit boundaries is also known. Thus, if the position of one bit boundary is determined, the boundary positions of the other bits may easily be determined based on the number of bits. Preferably, the bit boundaries are a constant distance or angle from one another within the same circle. That is, the bits of the inner circle have a same first size, and the bits of the outer circle have a same second size.

Since there is at least one transition within the inner bits and outer bits, at least one boundary may be determined for both the inner bits and outer bits. For example, if a first transition between black and white occurs between two inner bits, the first transition represents a first boundary location between two inner bits. This first transition and the known distance between inner boundaries may then be used to find other inner boundary locations. That is, the other inner boundaries will be at fixed locations relative to the first transition. Likewise, the outer boundaries of the outer bits may be determined based on one transition between two outer bits.

After the boundaries of the inner and outer bits are determined, the angle object (or matching inner and outer boundaries) is found by calculating angle differences between each outer boundary and adjacent inner boundary starting at a selected outer boundary. First, an angle difference is calculated for a first outer boundary, and then for a second outer boundary. The calculations are performed on each outer boundary in a clockwise direction starting at the first outer boundary. That is, a angle difference is calculated for each outer boundary.

A plurality of expected angle differences are indicated in FIG. 11 between each outer bit boundary and the adjacent inner bit boundary starting at the angle object (the matched boundaries between bits 7 and 13 and bits 1 and 6). These expected angle differences are also arranged in a particular order. For example, the correct angle object has a zero angle difference, and the next boundary pair in a clockwise direction has an angle difference $\Delta 1$, between the outer bit boundary between bits 7 and 8 and the adjacent inner bit boundary between bits 1 and 2. Likewise, an angle difference $\Delta 1+\Delta 2$ is shown between the next outer bit boundary between bits 8 and 9 and the adjacent inner bit boundary between bits 2 and 3. The expected angles differences starting at the angle object are 0, $\Delta 1$, $\Delta 1+\Delta 2$, $\Delta 1+\Delta 2+\Delta 3$, $\Delta 1+\Delta 2+\Delta 3+\Delta 4$, and $\Delta 1+\Delta 2+\Delta 3+\Delta 4+\Delta 5$.

After the angle differences are calculated for all the outer boundaries starting at the first outer boundary, the angle differences are then compared to expected angle differences to determine the correct angle object. The angle differences that most closely match the expected angle differences are associated with the correct angle object. For example, the first angle difference is compared to the expected angle difference of zero, and the second angle difference is compared to the expected angle difference of $\Delta 1$. That is, each angle difference is compared with a corresponding expected angle difference. FIG. 12 is a table that summarizes the angle differences between each outer boundary and adjacent inner boundary starting at a particular first outer boundary within the coded object 700 of FIG. 7.

For example, if the outer boundary between bits 7 and 13 are selected as the first outer boundary, a first angle difference between the first outer boundary and a first adjacent inner boundary (between bits 1 and 6) is about zero. A second angle difference between a second outer boundary (between bits 7 and 8) and a second adjacent inner boundary (between bits 1 and 2) is $\Delta 1$. A third angle difference is $\Delta 1+\Delta 2$, a fourth angle difference is $\Delta 1+\Delta 2+\Delta 3$, etc. Since the outer boundary between bits 7 and 13 is the correct angle object, each angle difference will be about equal to the corresponding expected angle differences.

In contrast, if the outer boundary between bits 12 and 13 is selected as the first outer boundary, the angle differences will be significantly different from the expected angle differences. For example, the first angle difference of $\Delta 1+\Delta 2+\Delta 3+\Delta 4+5$ is much greater than the first expected angle difference of zero, and the second angle difference of zero is smaller than the second expected angle difference of $\Delta 1+\Delta 2$. Thus, the outer boundary between bits 12 and 13 would not be defined as the correct angle object.

The present invention may implement any of the above described methods of detecting and selecting a correct reference object. These detection methods may be used alone or in any combination. Additionally, the present invention may include methods for detecting a position of a particular object (e.g., a movable object) of a coded object.

FIG. 13 is a flowchart illustrating a double-precision method 1300 for detecting the position of a particular object of a coded object in accordance with one embodiment of the present invention. For example, the particular object may be movable within a region that includes a white neighbor pixel and a black neighbor pixel, the white neighbor pixel changes to a black pixel as the particular object moves over the white neighbor pixel. Likewise, the black neighbor pixel changes to white as the particular object moves over the black neighbor pixel. Examples of this type of coded object, which may be used with this double-precision method, are described below with references to FIGS. 14–17, for example.

Initially, in operation 1302 all pixels of a first half of a region are compared with associated pixels of a second half of the region. The number of pixels within the region may be any suitable number for accurately detecting the particular object. For example, each region half may include one pixel. Alternatively, each region half may include a plurality of pixels. In one embodiment, the first half pixels are mostly black (pixels Z), and the second half pixels are mostly white (pixels Y).

After first half pixels are compared with associated second half pixels, a difference between each pair of pixels Z and Y is determined in operation 1304. In operation 1306, a position of the particular object is then defined as the pair of pixels Z and Y that has the minimum difference.

This embodiment may be implemented, for example, by the following expression, wherein pixel is the particular object:

position of pixel $X$=position of Min(pixel $Z$–pixel $Y$) pixel pair

Of course, those skilled in the art would realize that other expressions may be utilized for the double-precision positioning method.

Figure 14:
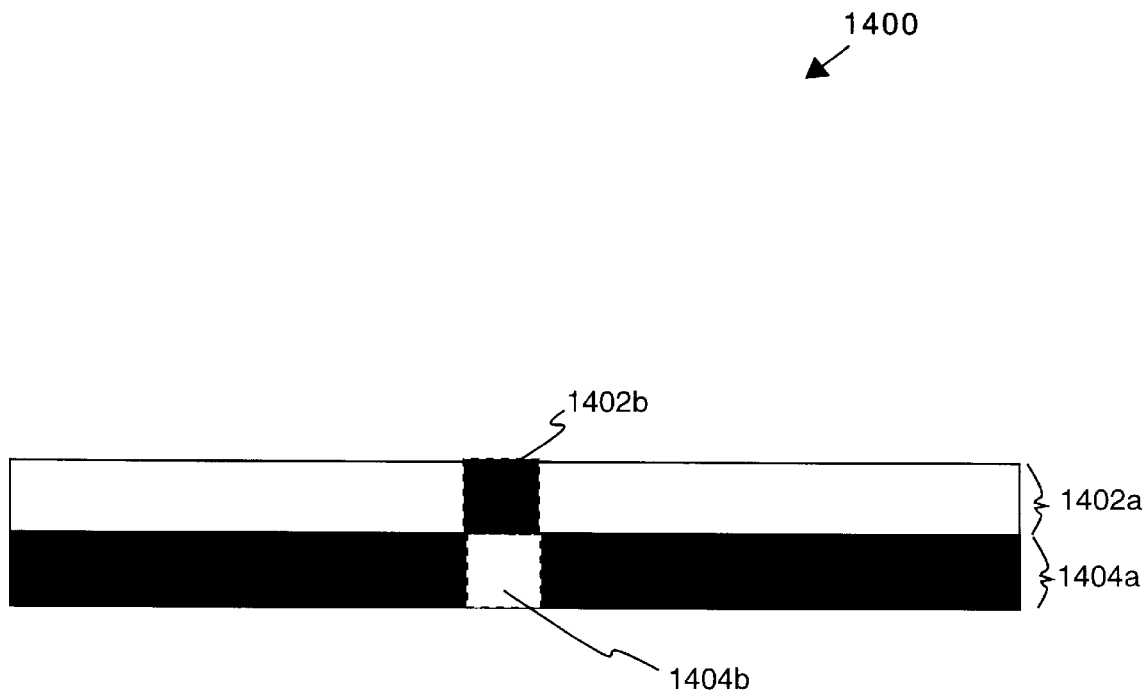
FIG. 14 is a coded object that includes a double-precision movable object that includes a white pixel and a black pixel in accordance with one embodiment of the present invention.

FIG. 14 is a coded object 1400 that includes a double-precision movable object that includes a white pixel 1402b and a black pixel 1402a in accordance with one embodiment of the present invention. The coded object 1400 includes a mostly white half 1402 and a mostly black half 1404. The white pixel 1402b of the movable object is part of the mostly black half 1402. Likewise, the black pixel 1404b of the movable object is part of the mostly white half 1404.

The movable object (1402a and 1404a) is slidably movable within the halves 1402 and 1404. For example, a user may move the movable object from the left side of the halves to the right side. As the movable object passes through each half, the pixels of each half change colors. In other words, each of the movable object pixels (1402b and 1404b) has a color that is a reverse of most pixels within the associated half.

The coded object 1400 of FIG. 14 is one example of a coded object that may utilize the double-precision positioning method of FIG. 9 to determine the position of the movable object. For example, each pixel in the mostly white half 1404 is subtracted from each pixel in the mostly black half 1402. The position of the pair of pixels that result in a minimum value are defined as the position of the movable object (1402b and 1402a).

Figure 15:
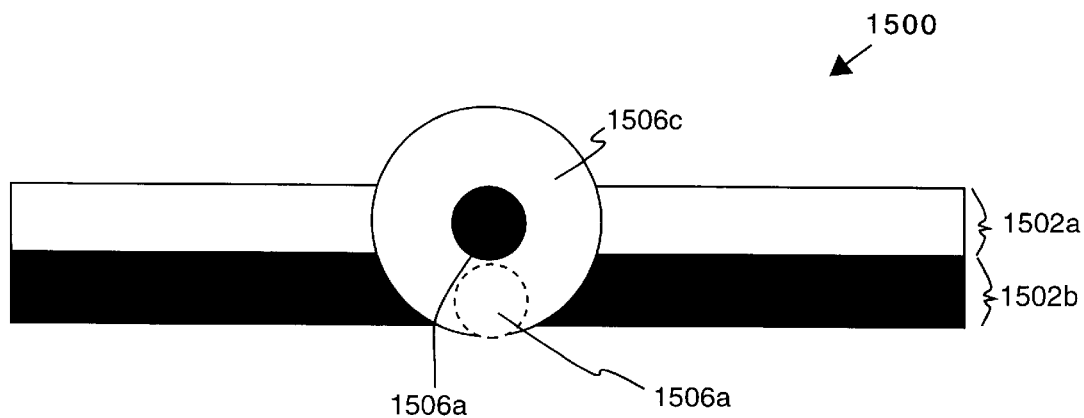
FIG. 15 is a coded object that includes a double-precision circular movable object that includes a white pixel and a black pixel in accordance with an alternative embodiment of the present invention.

FIG. 15 is a coded object 1500 that includes a double-precision circular movable object 1506 that includes a white pixel 1506a and a black pixel 1506b in accordance with an alternative embodiment of the present invention. The coded object 1500 provides a mechanism for detecting the position of the circular movable object 1506 by being configured to implement the same process as the previous coded object 1400 That is, each pixel in the mostly white half 1502a is subtracted from each pixel in the mostly black half 1502b. The position of the pair of pixels that result in a minimum value are defined as the position of the movable object 1506a. In contrast to the coded object 1400 of FIG. 14, however, the circular movable object 1506 of FIG. 15 may be rotated without effecting the detection results.

Figure 16:
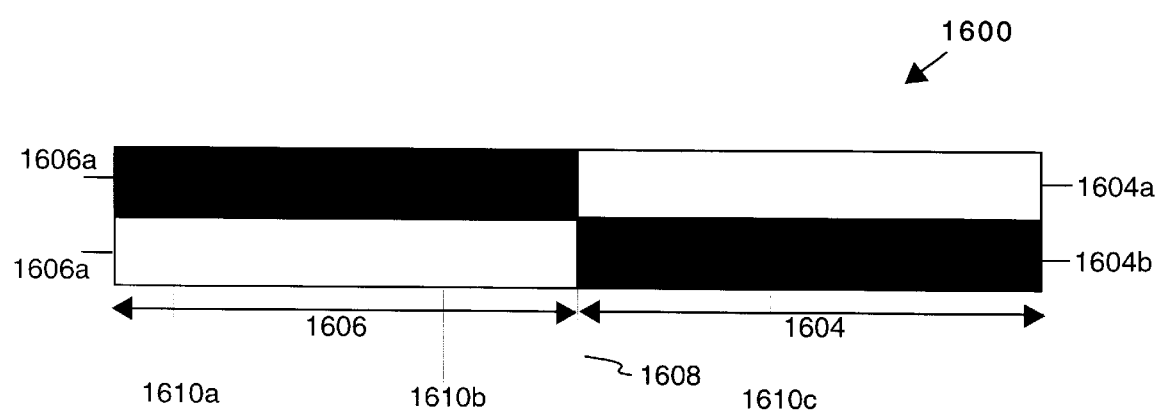
FIG. 16 is a coded object that forms a double-precision movable object that includes a white pixel and a black pixel in accordance with an alternative embodiment of the present invention.

FIG. 16 is a coded object 1600 that forms a double-precision movable object 1600 that includes a white pixel and a black pixel in accordance with an alternative embodiment of the present invention. In one embodiment, the movable object 1600 includes a first black portion 1606a positioned over a first white portion 1606b. The movable object also includes a second white portion 1604a positioned over a second black portion 1604b. The sizes of each portion may vary and depend on the particular requirements of the application. As shown, the black and white portions 1606 have a size that is about equal to the black and white portions 1604.

At any given time, the movable object 1600 is positioned relative to a reference point 1608. As shown, the movable object 1600 is substantially centered over the reference point 1608. However, the movable object may be moved by a user, for example, to the left of the reference point 1608 or to the right of the reference point 1608.

A position of the movable object 1600 may then be determined, for example, by comparing a first reference pixel that is positioned over a second reference pixel at the reference point 1608. For example, when the movable object is positioned such that the first white portion 1604a and black portion 1604b are positioned over the reference point 1608, a white pixel from the white portion 1604a is the first reference pixel and a black pixel from the black portion 1604b is the second reference pixel.

Implementing one embodiment of the double-precision method 1300 of FIG. 13, the second reference pixel is subtracted from the first reference pixel. If the result is greater than zero, it is determined that the movable object 1600 is positioned to the left of the reference point 1608 (e.g., the white and black portions 1604 are positioned over the reference point). If the result is less than zero, it is determined that the movable object 1600 is positioned to the right of the reference point 1608 (e.g., the white and black portions 1606 are positioned over the reference point).

In an alternative embodiment, the coded object 1600 includes a movable white portion 1604a and a movable black portion 1604b. As shown, the movable white portion 1604a slides along a stationary black portion 1606a, and the movable black portion 1604b slides along a stationary white portion 1606b.

In this alternative embodiment, a position of an edge 1608 of the movable portions may be quickly determined by any suitable search technique. For example, a first pixel pair at position 1610a and a second pixel pair at 1610b are analyzed to determine a gross position of the edge 1608. That is, it is determined whether the edge 1608 is between the two pixel pairs or outside of the two pixel pairs. If the two pixel pairs have the same relative black and white pixel placement, then the edge is located outside of the two pixel pairs. If the two pixel pairs have different color arrangements, the edge 1608 may be located between the two pixel pairs. This process is repeated until the location of the edge 1608 is determined with the desired accuracy. Thus, depending on the level of desired accuracy, the coded object 1600 of this alternative embodiment allows for quicker searches than the coded object 1400 or 1500, wherein relatively more pixel pairs must be analyzed to determine the position of the smaller movable object.

Figure 17:
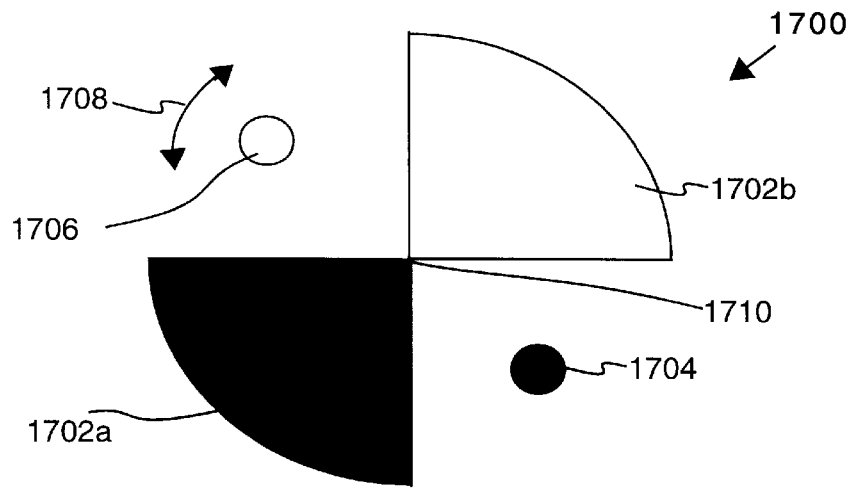
FIG. 17 is a coded object that includes a double-precision movable object that includes a plurality of white pixels and black pixels for detecting an orientation of the movable object in accordance with an alternative embodiment of the present invention.

FIG. 17 is a coded object that includes a double-precision movable object 1702 that includes a plurality of white pixels and black pixels for detecting an orientation of the movable object 1702 in accordance with an alternative embodiment of the present invention. The movable object 1702 includes a first portion 1702a and a second portion 1702b. The first portion 1702a has a plurality of black pixels 1702c. The coded object 1700 also includes a first region 1704 and a second region 1706.

In this embodiment, the movable object 1702 is configured to be rotatable through a range of angles. For example, the movable object may rotate 360 degrees in a counter clockwise or clockwise direction 1708 relative to a center axis 1710. As shown, the first portion 1702a is positioned between about 180 and 270 degrees, and the second portion 1702b is positioned between about 0 and 90 degrees. By way of example, the first portion 1702a and second portion 1702b may be rotated 180 degrees such that the first portion 1702a switches positions with the second portion 1702b. By way of another example, the first and second portions may be rotated clockwise 90 degrees such that the first portion 1702a completely covers the second region 1706 and the second portion 1702b completely covers the first region 1704.

The first region 1704 is in the form of black pixels for most positions, or angle ranges, of the second portion 1702*b* of the movable object 1702. However, when the second portion 1702*b* is moved within a first range of angles, the first region 1704 changes to white pixels. Likewise, the second region 1706 is in the form of white pixels for most positions of the first portion 1702*a* of the movable object 1702, except for a second range of angles of the first portion 1702*a*. That is, the first portion 1702*a* changes the second region 1706 pixels from white to black for a second range of angles.

The first and second range of angles may be any range between about 0 and 360 degrees. Additionally, the first range does not have to equal the second range. As shown, the first range of angles of the second portion 1702*b*, wherein the first region 1704 pixels are white, is between about 270 and 360 degrees, and the second range of angles of the first portion 1702*a* is between about 180 and 270 degrees. That is, the first region 1704 is black for every angle of the second portion 1702*b* of the movable object, except 270 to 360 degrees. Thus, a position or, more precisely, a range of angles of the first and second portions of the movable object 1702 may be determined be comparing the relative luminosity's of the first and second regions (e.g., 1704 and 1706.

Implementing one embodiment of the double-precision method 1300 of FIG. 13, the second region 1706 luminosity value is subtracted from the first region 1704 luminosity value. If the result is greater than zero, it is determined that the first portion 1702*a* is not positioned between 90 and 180 degrees and the second portion 1702*b* is not positioned between 270 and 360 degrees. If the result is less than zero, it is determined that the first portion 1702*a* is positioned between 90 and 180 degrees and the second portion 1702*b* is positioned between 270 and 360 degrees.

In sum, in one embodiment the movable object may be located within a range of positions that are divided into a first set and a second set. When the movable object's position is in the first set, a white neighbor pixel remains white and a black neighbor pixel remains black. However, when the movable object's position is in the second set of positions, the white neighbor pixel changes to black and the black neighbor pixel changes to white.

Figure 18:
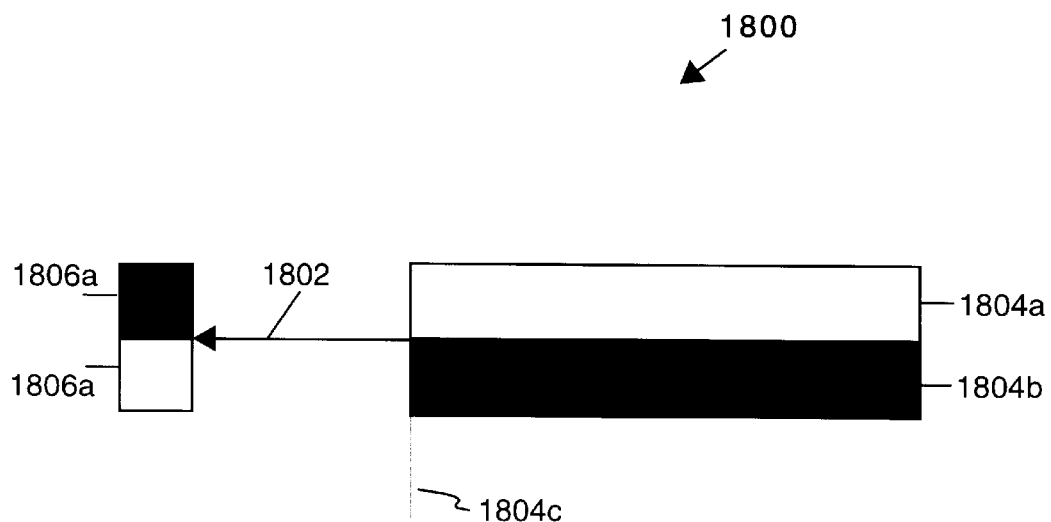
FIG. 18 is a coded object that includes a double-precision movable object that includes a plurality of white pixels and black pixels for detecting a range of linear positions of the movable object in accordance with an alternative embodiment of the present invention.

The first and second sets may each include one or more orientation indicators. For example, each set may indicate a range of angles as described in reference to FIG. 17. Alternative, each set may indicate a range of linear positions. For example, FIG. 18 is a coded object that includes a double-precision movable object 1804 that includes a plurality of white pixels 1804*a* and black pixels 1804*b* for detecting a range of linear positions of the movable object 1804 in accordance with an alternative embodiment of the present invention. A similar technique as described in reference to FIG. 17 may utilized to determine whether the movable object 1804 has moved (e.g., along path 1802) across a stationary object 1806.

The above-described tracking embodiments may be implemented to track coded objects that have a fixed position, as well as objects that are movable within the physical system or within a fixed region of the physical system. Several embodiments of fixed coded objects and movable coded objects are described by Piernot, et al., which is incorporated herein by reference above.

The coded object recognition system of the present invention has many advantages over conventional bar-code recognition systems. If one wanted to track and identify many coded physical objects within a physical system, such as an interactive game board, the image resolution and lighting conditions will sometimes be inadequate for conventional code recognition systems to function properly. That is, since the interactive game board is designed for home use, the lighting conditions will radically vary.

For example, the lighting conditions could result in a limited dynamic range in the image, which would make it difficult to distinguish black from white and thereby to recognize whether a code is present. Additionally, conventional code systems would require an expensive camera that has a high dynamic range in order to adjust for inadequate lighting conditions, for example. Since an image of the physical system may contain many coded objects, the resolution for each coded object may be relatively low. In contrast to conventional systems, the present invention will recognize codes even, for example, with variable lighting conditions, low resolution parameters, and low dynamic range cameras.

Additionally, since the code recognition techniques of the present invention include relatively simple calculations, the present invention may be implemented on a relatively low-end, low-cost processor. That is, the techniques of the present invention minimize the number of floating point operations that are required to track coded objects. Thus, the present invention may also be implemented in real time for a game application, for example.

Although the foregoing invention has been described in some detail for purposes of clarity of understanding, it will be apparent that certain changes and modifications may be practiced within the scope of the appended claims. For example, the techniques for tracking coded objects of the present invention may be implemented by comparing RGB values, rather than luminosity values. Accordingly, the present embodiments are to be considered as illustrative and not restrictive, and the invention is not to be limited to the details given herein, but may be modified within the scope and equivalents of the appended claims.

What is claimed is:

1. A method of locating a correct reference pixel within an image, the correct reference pixel representing a reference object within a coded object that has a known code pattern, the method comprising:

receiving an image having a plurality of coded object pixels that include a first expected reference pixel and a plurality of first pixels and second pixels, wherein each first pixel is expected to have a different color from an associated second pixel; and step for determining whether the first expected reference pixel is a correct reference pixel that represents the reference object of the coded object by comparing luminosity values of the first pixel and the second pixel to determine if the expected reference pixel and first and second pixels substantially match the known code pattern.

2. A method of tracking a position of a movable object with respect to a reference object, the method comprising:

receiving an image having a plurality of coded object pixels that include a first pixel and second pixel, wherein the first pixel has an opposite color than the second pixel; and step of determining a position of the movable object pixel with respect to the reference object by comparing luminosity values of the first and second pixel.

3. The method recited in claim 2 wherein the position of the movable object indicates whether the movable object is positioned within a particular range of angles with respect to the reference object.

4. The method recited in claim 3, wherein the position of the movable object indicates whether a center of the movable object is to the left or to the right of the reference object.

5. A physical system having a movable object and a reference object that are configured to be scanned by a camera and represented in an image that is received as input to a computer implemented coded object recognition program, the physical system comprising:

a first region having a plurality of first subregions that include a first portion of the movable object, wherein the first subregions are mostly a first color that is different from the first portion of the movable object; and a second region having a plurality of second subregions that include a second portion of the movable object, wherein the second subregions are mostly a second color that is significantly different from the second portion of the movable object and most of the first subregions whereby a position of the movable object may be determined by comparing luminosity values for selected pairs of the first and second subregions.

6. The coded object recited in claim 5, wherein the movable object is configured to be rotatable.

7. The coded object recited in claim 5, wherein the position of the movable object is determined with respect to a reference object.

8. A method of finding a reference object within a coded object having a plurality of regions with each region having a plurality of subregions, at least a majority of a first one of the subregions having a different color from a second one of the subregions, the reference object having a known relative position to other objects within the coded object so that the reference object is utilizable to locate the other objects within the coded object, the method comprising:

(a) selecting a first one of the subregions within a selected one of the regions within the coded object;

(b) selecting a first region and a second region within the coded object, the selected first and second region forming a plurality of subregion pairs, each subregion pair including a subregion from the seleced first region and a subregion from the selected second region;

(c) comparing luminosity values of the subregions within each subregion pair; and (d) determining whether the selected subregion is the reference object based on the comparisons of the luminosity values for each subregion pair.

9. A method as recited in claim 8 wherein the selected subregion is determined to be the reference object when more than a first predetermined number of the selected first region's subregions from each subregion pair differ from the selected second region's subregions from such each subregion pair by more than a second predetermined number.

10. A method as recited in claim 8 further comprising comparing the luminosity value of the selected subregion and each subregion pair, wherein the determination of whether the selected subregion is the reference object is further based on the comparison of the luminosity value of the selected subregion and each subregion pair.

11. A method as recited in claim 10 wherein a maximum luminosity value from each of the subregion pairs is known to be greater than the reference object's luminosity value, and the selected subregion is determined to be the reference object when more than a first predefined number of maximum luminosity values of the subregion pairs are greater than the selected subregion's luminosity value.

12. A method as recited in claim 10 wherein a minimum luminosity value from each of the subregion pairs is known to be lower than the reference object's luminosity value, and the selected subregion is determined to be the reference object when more than a first predefined number of minimum luminosity values of the subregion pairs are lower than the selected subregion's luminosity value.

13. A method as recited in claim 8, wherein the selected subregion is determined to be the reference object when the sum of luminosity differences between each first subregion and second subregion within each subregion pair is greater than a predefined number.

14. A method as recited in claim 10 wherein each subregion pair, along with the selected subregion, are expected to have luminosity values wherein a first luminosity value is at least greater than a second and third luminosity value by a second predefined number and the second and third luminosity values have a difference that is not greater than a third predefined number, and the selected subregion is determined to be the reference object when more than a first predefined number of subregion pairs, along with the selected subregion, have luminosity values wherein the first luminosity value is at least greater than the second and third luminosity value by the second predefined number and the second and third luminosity values have a difference that is not greater than the third predefined number.

15. The method recited in claim 8, wherein the coded object further includes an angle object, wherein the method further comprising:

locating the angle object; and determining the coded object's orientation based on a location of the angle object and the reference object.

16. A coded object comprising:

a reference object;

a first region having a plurality of first subregion pairs, wherein each first subregion pair includes two opposite colored subregions; and a second region having a plurality of second subregion pairs, wherein each second subregion pair includes two opposite colored subregions, wherein the first subregion pairs form a plurality of first identifiers for the coded object and the second subregion pairs form a plurality of second identifiers for the coded object.

17. The coded object recited in claim 16, wherein each identifier has an associated value based on a relative placement of a black and white portion within each identifier.

18. The coded object recited in claim 16, wherein one subregion pair selected from the group consisting of the first subregion pairs and second subregion pairs form a angle object, wherein the selected subregion pair has substantially equal color subregions.

19. The coded object recited in claim 16, wherein a first boundary between two of the first identifiers substantially aligns with a second boundary between two of the second identifiers such that a position of the alignment of first and second boundaries may be defined as a position of an angle object.

20. The coded object recited in claim 19, wherein both the first and second boundaries have a color change between the two first identifiers and the two second identifiers.

21. The coded object recited in claim 19, wherein there is at least a color change between two of the first identifiers and between two of the second identifiers.

22. The coded object recited in claim 16, wherein the reference object is white and the coded object further includes a black isolation object that is adjacent to the reference object such as to enhance detection of the reference object and reduce anti-aliasing.

23. A computer readable medium containing instructions for finding a reference object within a coded object having a plurality of regions with each region having a plurality of subregions, at least a majority of a first one of the subregions having a different color from a second one of the subregions, the reference object having a known relative position to other objects within the coded object so that the reference object is utilizable to locate the other objects within the coded object, the computer readable medium comprising computer code for:

(a) selecting a first one of the subregions within a selected one of the regions within the coded object;

(b) selecting a first region and a second region within the coded object, the selected first and second region forming a plurality of subregion pairs, each subregion pair including a subregion from the seleced first region and a subregion from the selected second region;

(c) comparing luminosity values of the subregions within each subregion pair; and (d) determining whether the selected subregion is the reference object based on the comparisons of the luminosity values for each subregion pair.

24. A computer readable medium as recited in claim 23 wherein the selected subregion is contained within the selected first region.

25. A computer readable medium as recited in claim 23 wherein the selected subregion is determined to be the reference object when more than a first predetermined number of the selected first region's subregions from each subregion pair differ from the selected second region's subregions from such each subregion pair by more than a second predetermined number.

26. A computer readable medium as recited in claim 23 further comprising code for:

selecting a next selected subregion, a next first region, and a next second region, the next selected first and second regions forming a plurality of next subregion pairs, each next subregion pair including a subregion from the next seleced first region and a subregion from the next selected second region, and repeating acts (c) and (d) for the next selected subregion, the next first regions the next second region, and the next subregion pair.

27. A computer readable medium as recited in claim 26 wherein the next selected subregion is contained within the next selected first region.

28. A computer readable medium as recited in claim 26 wherein only one of the previous selected subregion and the next selected subregion are determined to be the reference object.

29. A computer readable medium as recited in claim 26 wherein the previous selected subregion is determined to be the reference object when the previous selected subregion has a number of first subregions from each previous subregion pair that differ from the second subregions from such previous subregion pair by more than the second predetermined number is greater than a number of first subregions from each next subregion pair that differ from the second subregions from such next subregion pair by more than the second predetermined number and is greater than the first predetermined number, and the next selected subregion is determined to be the reference object when the next selected subregion has a number of first subregions from each next subregion pair that differ from the second subregions from such next subregion pair by more than the second predetermined number is greater than a number of first subregions from each previous subregion pair that differ from the second subregions from such previous subregion pair by more than the second predetermined number and is greater than the first predetermined number.

30. A computer readable medium as recited in claim 23 further comprising computer code for comparing the luminosity value of the selected subregion and each subregion pair, wherein the determination of whether the selected subregion is the reference object is further based on the comparison of the luminosity value of the selected subregion and each subregion pair.

31. A computer readable medium as recited in claim 30 wherein a maximum luminosity value from each of the subregion pairs is known to be greater than the reference object's luminosity value, and the selected subregion is determined to be the reference object when more than a first predefined number of maximum luminosity values of the subregion pairs are greater than the selected subregion's luminosity value.

32. A computer readable medium as recited in claim 30 wherein a minimum luminosity value from each of the subregion pairs is known to be lower than the reference object's luminosity value, and the selected subregion is determined to be the reference object when more than a first predefined number of minimum luminosity values of the subregion pairs are lower than the selected subregion's luminosity value.

33. A computer readable medium as recited in claim 30 further comprising computer code for:

selecting a next selected subregion, a next first region, and a next second region, the next selected first and second regions forming a plurality of next subregion pairs, each next subregion pair including a subregion from the next seleced first region and a subregion from the next selected second region, and repeating acts (c) and (d) for the next selected subregion, the next first regions the next second region, and the next subregion pair.

34. A computer readable medium as recited in claim 33 wherein a maximum luminosity value from each of the subregion pairs is expected to be greater than the reference object's luminosity value, the previous selected subregion is determined to be the reference object when the previous selected subregion has a highest number of maximum luminosity values of the subregion pairs that are greater than the selected subregion as compared to the next selected subregion, and the next selected subregion is defined as the reference object when the next selected subregion has a highest number of maximum luminosity values of the next subregion pairs that are greater than the next selected subregion as compared to the previous selected subregion.

35. A computer readable medium as recited in claim 23 wherein the selected subregion is determined to be the reference object when the sum of luminosity differences between each first subregion and second subregion within each subregion pair is greater than a predefined number.

36. A computer readable medium as recited in claim 35 further comprising computer code for:

selecting a next selected subregion, a next first region, and a next second region, the next selected first and second regions forming a plurality of next subregion pairs, each next subregion pair including a subregion from the next seleced first region and a subregion from the next selected second region, and repeating acts (c) and (d) for the next selected subregion, the next first region, the next second region, and the next subregion pair.

37. A computer readable medium as recited in claim 36 wherein the previous selected subregion is determined to be the reference object when a sum of luminosity differences between each first subregion and second subregion within each previous subregion pair is greater than a predefined number and is greater than the predefined number, and the next selected subregion is determined to be the reference object when a sum of luminosity differences between each first subregion and second subregion within each next subregion pair is greater than a predefined number and is greater than the predefined number.

38. A computer readable medium as recited in claim 30 wherein each subregion pair, along with the selected subregion, are expected to have luminosity values wherein a first luminosity value is at least greater than a second and third luminosity value by a second predefined number and the second and third luminosity values have a difference that is not greater than a third predefined number, and the selected subregion is determined to be the reference object when more than a first predefined number of subregion pairs, along with the selected subregion, have luminosity values wherein the first luminosity value is at least greater than the second and third luminosity value by the second predefined number and the second and third luminosity values have a difference that is not greater than the third predefined number.

39. A computer readable medium as recited in claim 38 further comprising computer code for:

selecting a next selected subregion, a next first region, and a next second region, the next selected first and second regions forming a plurality of next subregion pairs, each next subregion pair including a subregion from the next seleced first region and a subregion from the next selected second region, and repeating acts (c) and (d) for the next selected subregion, the next first region, the next second region, and the next subregion pair.

40. A computer readable medium as recited in claim 39 wherein the previous selected subregion is defined as the reference object when the previous selected subregion has a highest number of previous subregion pairs, along with the previous selected subregion, that have luminosity values wherein a first luminosity value is at least higher than a second and third luminosity value by a second predefined number and the second and third luminosity values have a difference that is not greater than a third predefined number, as compared to the next selected subregion, and the next selected subregion is defined as the reference object when the next selected subregion has a highest number of next subregion pairs, along with the next selected subregion, that have luminosity values wherein a first luminosity value is at least higher than a second and third luminosity value by a second predefined number and the second and third luminosity values have a difference that is not greater than a third predefined number, as compared to the previous selected subregion.

41. The computer readable medium recited in claim 23, wherein the coded object further includes an angle object, the computer readable medium further comprising computer code for:

locating the angle object; and determining the coded object's orientation based on a location of the angle object and the reference object.

* * * * *